US00RE40299E

(19) United States
(12) Reissued Patent
Bruinsma et al.

(10) Patent Number: US RE40,299 E
(45) Date of Reissued Patent: May 6, 2008

(54) MESOPOROUS-SILICA FILMS, FIBERS, AND POWDERS BY EVAPORATION

(75) Inventors: Paul J. Bruinsma, San Diego, CA (US); Suresh Baskaran, Kennewick, WA (US); Jagannadha R. Bontha, Richland, WA (US); Jun Liu, Richland, WA (US)

(73) Assignee: Battelle Memorial Institute, Richland, WA (US)

(21) Appl. No.: 09/481,988

(22) Filed: Jan. 11, 2000

Related U.S. Patent Documents

Reissue of:
(64) Patent No.: 5,922,299
Issued: Jul. 13, 1999
Appl. No.: 08/921,754
Filed: Aug. 26, 1997

U.S. Applications:
(63) Continuation-in-part of application No. 08/753,573, filed on Nov. 26, 1996, now abandoned.

(51) Int. Cl.
*C01B 33/12* (2006.01)

(52) U.S. Cl. ..... 423/335; 423/336
(58) Field of Classification Search ..... 423/335, 423/336
See application file for complete search history.

(56) References Cited

U.S. PATENT DOCUMENTS 4,913,966 A 4/1990 Garvey
5,057,296 A 10/1991 Beck
5,098,684 A 3/1992 Kresge (Continued)

OTHER PUBLICATIONS

C.T. Kresge, M.E. Leonowocz, W.J. Roth, J.C. Vartuli & J.S. Beck, Ordered Mesoporous Molecular Sieves Synthesized a Liquid–Crystal Template Mechanism, Nature, vol. 359, Oct. 22, 1992.

(Continued)

*Primary Examiner*—Paul Marcantoni
(74) *Attorney, Agent, or Firm*—Marger Johnson & McCollom, P.C.

(57) ABSTRACT

This invention pertains to surfactant-templated nanometer-scale porosity of a silica precursor solution and forming a mesoporous material by first forming the silica precursor solution into a preform having a high surface area to volume ratio, then rapid drying or evaporating a solvent from the silica precursor solution. The mesoporous material may be in any geometric form, but is preferably in the form of a film, fiber, powder or combinations thereof. The rapid drying or evaporation of solvent from the solution is accomplished by layer thinning, for example spin casting, liquid drawing, and liquid spraying respectively. Production of a film is by layer thinning, wherein a layer of the silica precursor solution is formed on a surface followed by removal of an amount of the silica precursor solution and leaving a geometrically thinner layer of the silica precursor solution from which the solvent quickly escapes via evaporation. Layer thinning may be by any method including but not limited to squeegeeing and/or spin casting. In powder formation by spray drying, the same conditions of fast drying exists as in spin-casting (as well as in fiber spinning) because of the high surface-area to volume ratio of the product. When a powder is produced by liquid spraying, the particles or micro-bubbles within the powder are hollow spheres with walls composed of meso-porous silica. Mesoporous fiber formation starts with a similar silica precursor solution but with an added pre-polymer making a pituitous mixture that is drawn into a thin strand from which solvent is evaporated leaving the meso-porous fiber(s).

59 Claims, 21 Drawing Sheets

U.S. PATENT DOCUMENTS

| | | | | | |
|---|---|---|---|---|---|
| 5,102,643 | A | | 4/1992 | Kresge | |
| 5,104,515 | A | | 4/1992 | Chu | |
| 5,108,725 | A | | 4/1992 | Beck | |
| 5,112,589 | A | | 5/1992 | Johnson | |
| 5,145,816 | A | | 9/1992 | Beck | |
| 5,156,829 | A | | 10/1992 | McCullen | |
| 5,198,203 | A | | 3/1993 | Kresge | |
| 5,211,934 | A | | 5/1993 | Kresge | |
| 5,215,737 | A | | 6/1993 | Chu | |
| 5,238,676 | A | | 8/1993 | Roth | |
| 5,250,282 | A | | 10/1993 | Kresge | |
| 5,256,277 | A | | 10/1993 | Del Rossi | |
| 5,264,203 | A | | 11/1993 | Beck | |
| 5,300,277 | A | | 4/1994 | Kresge | |
| 5,321,102 | A | | 6/1994 | Loy | |
| 5,364,797 | A | | 11/1994 | Olson | |
| 5,470,802 | A | | 11/1995 | Gnade | |
| 5,472,913 | A | | 12/1995 | Havemann | |
| 5,494,858 | A | | 2/1996 | Gnade | |
| 5,504,042 | A | | 4/1996 | Cho | |
| 5,523,615 | A | | 6/1996 | Cho | |
| 5,561,318 | A | | 10/1996 | Gnade | |
| 5,565,142 | A | | 10/1996 | Deshpande | |
| 5,622,684 | A | | 4/1997 | Pinnavaia | |
| 5,625,108 | A | | 4/1997 | Perego | |
| 5,647,962 | A | | 7/1997 | Jansen | |
| 5,661,344 | A | | 8/1997 | Havemann | |
| 5,723,368 | A | | 3/1998 | Cho | |
| 5,736,425 | A | | 4/1998 | Smith | |
| 5,753,305 | A | | 5/1998 | Smith | |
| 5,789,819 | A | | 8/1998 | Gnade | |
| 5,795,556 | A | | 8/1998 | Jansen | |
| 5,795,559 | A | | 8/1998 | Pinnavaia | |
| 5,800,799 | A | | 9/1998 | Pinnavaia | |
| 5,804,508 | A | | 9/1998 | Gnade | |
| 5,807,607 | A | | 9/1998 | Smith | |
| 5,840,271 | A | | 11/1998 | Carrazza | |
| 5,847,443 | A | | 12/1998 | Cho | |
| 5,858,457 | A | * | 1/1999 | Brinker et al. | 427/162 |
| 5,922,299 | A | * | 7/1999 | Bruinsma | 427/335 |

OTHER PUBLICATIONS

Jeffrey S. Beck and James C. Vartuli, Recent Advances in the Synthesis, Characterization and Applications of Mesopor Molecular Sieves, Curr, Opinion in Solid State and Material Science, 1996, 1: 76–87 (no month avail.).

J.S. Beck, J.C. Vartuli, W.J. Roth, M.E.> Leon wicz, C.T> Kresge, K.D. Schmitt, C.T–W Chu, D.H. Olson, E.W. Sheppa S.B. McCullen, J.B. Higgens and J.L. Schlenker, A New Family of Mesop rous Molecular Sieves Prepared with Liquid Crystal Templates, J. Am. Chem. Soc., 1992, 114:10835, no month avail.

Qisheng Huo, David I. Margolese, Ulike Ciesla, Dirk G. Demouth, Pingyun Feng, Thurman E. Gier, Peter Sieger, Ali Firouzi, Bradley F. Chmelka, Ferdi Schuth and Galen D. Stucky, Organization of Organic Molecules with Inorganix Molecular Species into Nanocomposite Biphase Arrays, Chem. Mater. 1994, 6: 1176–1191, no month avail.

A Firouzi, D. Kumar, L.M. Bull, T. Besier, P. Sieger, Q. Iluo, S.A. Walker, J.A. Zasadzinski, C. Glinka, J. Nicol, D. Margolese, G.D. Stucky, B.F. Chmelka, Cooperative Organization of Inorganic–Surfactant and Biomimetic Assemblies, Science vol. 267, Feb. 24, 1995, pp. 1138–1143.

Peter T. Taney and Thomas J. Pinnavaia, A Neutral Templating Route to Mesoporous Molecular Sieves, Science, vol. 26 Feb. 10, 1995, pp. 865–867.

Stephen A. Bagshaw, Eric Prouzet and Thomas J. Pinnavaia, Templating of Mesoporous Molecular Sieves by Nonionic Poyletheylene Oxide Surfactants, Science vo. 269, Sep. 1, 1995, pp. 1243–1244.

Peter T. Taney and Thomas J. Pinnavaia, Mesoporous Silica Molecular Sieves Prepared by Ionic and Neutral Surfactant Templating: A Comparison of Physical Properties, Chem. Mater. 1996 vo. 8, 2068–2079, no month avail.

David M. Antonelli and JAckie Y. Ying, Synthesis of a Stable Hexagonally Packed Mesoporous Niobium Oxide Molecular Sieve Through a Novel Ligand–Assisted Templating Mechanism, Angew, Chem. Int. Ed. Engl., 1996, vol. 35, No. 4, pp. 426–430, no month avail.

David M. Antonelli and Jackie Y. Ying, Synthesis and Characterization of Hexagonally Packed Mesoporous Tantalum Oxide Molecular Sieves, Chem. Mater. 199, vol. 8, pp. 874–881, no date avail.

Ilrike Siesla, Stefhan Schacht, Glen D. Stucky, Klaus K. Unger and Ferdi Schuth, Formation of a Porous Zirconium Oxide Phosphate with a High Surface Area by a Surfactant–Assisted Synthesis, Angew, Chem. Int. Ed. Engl. 1996, 35, No. 5, pp. 541–543, no month avail.

Sandra L. Burkett, Stephen D. Sims and Stephen Mann, Synthesis of Hybrid Inorganic–Organic Mesoporous Silica by Co–Condensations of Siloxane and Oranosiloxane Precursors, Chem. Commun., 1996, pp. 1367–1368, no month avail.

K.R. Kloetstra, J.C. Jansen and J. Van Bekkum, Composite Molecular Sieve Comprising MCM–41 with Intraporous ZS Structures, Symposium on Advances in FCC Conversion Catalysts presented before the Division of Petroleum Chemistry Inc. 211th National Meeting, American Chemical Society, New Orleans, LA, Mar. 24–29, 1996.

Hong Yang, Neil Cooms, Igor Sokolov and Geoffrey A. Ozin, Free–standing and Oriented Mesoporous Silica Films Grov at the Air–Water Interface, Nature, vol. 381, Jun. 13, 1996, pp. 589–592.

Chemical Abstracts, vol. 52: 798e.

Organization of Organix Molecules with Inorganic Molecular Species in Nanocomnposite Biphase Arrays, Huo, et al, American Chemical Society, 1994, 6, pp. 1176–1191.

Formation of Novel Oriented Transparent Films of Layered Silica–Surfactant Nanocomposites, M. Ogawa, American Checmical Socient, 1994, 116, pp. 7941–7942.

Synthesis of Oriented Films of Mesoporous Silica on Mica, Tang et al, Nature, vol. 379, 1996, p. 703.

Free–Standing and Oriented Mesoporous Silica Films Grown in the Air–Water Interface, Yanh et al., Nature, 1996, vol. 381, p. 589.

A simple sol–gel route for the preparation of silica–surfactant mesostructured material, M. Ogawa, Chem, Commun. 1996, pp. 1149–1150.

Continuous Mesoporous Silica Films with Highly Ordered Large Pore Structures, Zhao et al, Adv. Matter, 1998, vol. 16, pp. 1380–1385.

* cited by examiner

X-AXIS SCALE UNIT. . . . X 10E0
Y-AXIS SCALE UNIT. . . . (cc/g) X 10E2

X-AXIS SCALE UNIT. . . . (ANGSTROMS) X 10E0
Y-AXIS SCALE UNIT. . . . (cc/g) X 10E0

X-AXIS SCALE UNIT. . . . X 10E0
Y-AXIS SCALE UNIT. . . . (cc/g) X 10E2

X-AXIS SCALE UNIT. . . . (ANGSTROMS) X 10E0
Y-AXIS SCALE UNIT. . . . (cc/g) X 10E0

MESOPOROUS-SILICA FILMS, FIBERS, AND POWDERS BY EVAPORATION

Matter enclosed in heavy brackets [ ] appears in the original patent but forms no part of this reissue specification; matter printed in italics indicates the additions made by reissue.

This application is a continuation-in-part of U.S. application Ser. No. 08/753,573 filed Nov. 26, 1996, now abandoned.

This invention was made with Government support under Contract DE-AC06 76RLO 1830 awarded by the U.S. Department of Energy. The Government has certain rights in the invention.

FIELD OF THE INVENTION

The present invention relates generally to a mesoporous silica material made by an evaporative method. More specifically, the present invention relates to films, fibers and powders having mesoporous structure made from a silica precursor solution by layer thinning, for example spin casting; drawing; and spraying respectively. As used herein, the term "silica" means the presence of silicon (Si), without precluding additional metals.

BACKGROUND OF THE INVENTION

Porous silica powders, with ordered porosity in the nanometer scale, have utility for catalysis, gas separation and high surface area supports for self-assembled monolayer films. Mesoporous micro-bubbles in particular, have applications in separations, thermal barriers and micro-encapsulation for drug delivery.

Micron-sized bubbles composed of solid silica walls are commercially available and are used as fillers and within reflective paint for highway signs. U.S. Pat. No. 2,797,201 (Standard Oil Co., Ohio) describes hollow glass spheres with solid walls, by spray drying liquid alkali metal silicates containing a blowing agent. Sizes range from 50–300 μm. Because these products are not porous, they are not useful for catalysis, and gas separation.

Other formation techniques for mesoporous powders and films, discussed in the literature, involve slow growth from supersaturated solutions for several hours to one week. The previous methods are based on a precipitation processes in which dissolved silica co-precipitates with the surfactant micelles to form a mesoporous structure and typically involve heating the reactants in an autoclave for several hours to a week. A disadvantage of these methods is that there is no control over particle size and/or shape. Filtration, often tedious because of small particle size, is required to separate the solution from the mesoporous particles.

Work described in U.S. Pat. Nos. 5,264,203, 5,098,684, 5,102,643, and 5,238,676 shows mesoporous powder formation by in-situ solution-phase precipitation, which again requires substantial time from a minimum of about 1.25 hour to about 168 hour to obtain precipitated powders.

Huo et al., Chem. Mater. 1994, 6, 1176, discussed a method for producing mesoporous silica by an acid route. Tetraethoxysilane (TEOS) was added to a dilute aqueous solution of cetyltrimethyl ammonium chloride (CTAC) and HCl. The solution composition on a mole basis was: TEOS 1.0; CTAC 0.12; HCl 9.2; water 130. After ~30 min of stirring at room temperature, particles precipitated and were filtered from the remaining solution. Again, a significant amount of time (30 min) is needed to obtain precipitation of particles from the solution phase.

Tanev, P. T.; Pinnavaia, T. J.; Science, 1996, 271, 1267 used surfactant vesicles to template silica vesicles in a reaction mixture. The reaction mixture was vigorously stirred at ambient temperature for 18 hours to obtain the templated lamellar product with vesicular morphology, denoted MSU-V.

The method discussed by both Kresge, C. T., et al., Nature 1992, 359, 710; and Beck, J. S., et al., J. Am. Chem. Soc. 1992, 114, 10834 involves a slow growth, or co-precipitation, of silica and surfactant micelles over a period of 4 hours to 144 hours (5 days). Beck, J. S.; Hellring, S. D.; Vartuli, J. C. Abstract # COLL-311, ACS National Meeting, April 13–17, San Francisco, Calif., 1997, further indicate that 1700 $m^2/g$ is presently an upper limit of surface area.

Porous silica films have applications in catalysis, environmental remediation, energy storage, thermal barriers and energy storage. Porous silica films, in particular, are potentially useful as low dielectric constant interlayers in semiconductor devices, as low dielectric constant coatings on fibers and other structures, and in structured catalytic supports. Porous silica films produced by previous methods can be divided between random, gel-like silica films, and surfactant-templated films in which the pores are within a hexagonal lattice, with the characteristic pore diameter defined by the surfactant micelle.

Previous work resulting in mesoporous membranes from surfactant-templated powders and structures by in-situ solution-phase precipitation has been described in co-pending U.S. patent application Ser. No. 08/344,330. In-situ solution-phase precipitation requires substantial time from about 4 hours to 1 week to form a mesoporous membrane or film.

Hrubesh, L. W.; Poco, J. F., J. of Non-Cryst. Solids 1995, vol. 188, p. 46 applied "aerogel" technology to produce high-porosity films with random porosity. In the aerogel synthesis route, a hydrolyzed silicon-alkoxide solution is metered onto a spinning substrate. To avoid drying, the spinning apparatus is in an atmosphere saturated with solvent vapor. The spinner is stopped with a brake, and the retained spinning solution gels within a few minutes. The gel-coated substrate is immersed in solvent and subsequently dried under supercritical conditions.

Smith et al. (Smith, D. M.; Anderson, J.; Cho, C. C.; Gnade, B. E., Mat. Res. Soc. Symp. Proc. 1995, 371, 261, and Smith, D. M.; Anderson, J.; Cho, C. C.; Johnston, G. P.; Jeng, S. P., Mat. Res. Soc. Symp. Proc. 1995, 381, 261) applied "xerogel" technology as an alternative to aerogels. Here, the spin-cast silica sol-gel film is aged, washed and solvent exchanged, silated with a trimethylchlorosilane solution in heptane, and dried. In contrast to the aerogel process, the film is dried at ambient pressure. The aging and chemical treatment minimizes pore shrinkage during drying and makes the film hydrophobic, but the film becomes hydrophilic on heat-treatment, unless done in a forming gas environment.

Both techniques for spin-casting (1) aerogel and (2) xerogel films are complicated by the fact that spinning must be performed in solvent-saturated atmospheres (requiring explosion proofing) to avoid premature drying of the film.

In other work on mesoporous silica films, Ogawa (Ogawa, M., J. Am. Chem. Soc. 1994, 116, 7941) fabricated spin-cast silica-CTAB films. Ogawa used a CTAB/TMOS mole ratio of 0.40 in a solution that avoided gelation or precipitation and produced films that were lamellar, containing alternating layers of silica and bilayers of CTAB, and therefore not calcinable; surfactant can not be removed without degradation of the film structure. Accordingly, Ogawa did not calcine his silica films. Although Ogawa noted that rapid evaporation was essential for the formation of highly-ordered, lamellar CTAB-silica composites, those composites would not be expected to be stable to calcination, and would also not contain useful pore structures.

Further work by Ogawa (M. Ogawa, A SIMPLE SOL-GEL ROUTE FOR THE PREPARATION OF SILICA-SURFACTANT MESOSTRUCTURED MATERIALS, Chem. Commun., 1996, 1149–1150) was with a CTAC/TMOS ratio of 0.25. However, he used a substoichiometric ratio of water to silica (TMOS) of 2 (stoichiometric ratio of water to silica is 4). Ogawa's product, before calcination, has the 100, 110 and 200 reflections in the XRD pattern corresponding to a hexagonal structure. However, no information is given on calcined films in which the surfactant has been removed. It is inferred that Ogawa's product is unstable against calcination.

Porous silica fibers, with ordered porosity in the nanometer scale, have potential applications in catalysis, environmental remediation, thermal insulation and chemical sensors. Nanoporous or mesoporous fibers using the previously described sol-gel methods and stable against calcination have not been reported.

In the previous methods in the literature, there is no direct means for controlling particle size or pore volume fraction in powder, films or fibers.

Accordingly, there remains a need for mesoporous products having well defined morphology on both the nanometer scale (1–20 nm) (solid silica and pores) and the micrometer scale (0.1 μm–100 μm) (the characteristic dimension of the mesoporous product), and a method for making them in less time and without the need for filtration. Where spin-casting is done, there remains a need for a straight-forward method for producing mesoporous film(s) without supercritical drying, aging, silation of the film(s), or controlled gas environments.

SUMMARY OF THE INVENTION

This invention pertains to the development of surfactant-templated, nanometer-scale porosity of a silica precursor solution and forming a mesoporous material by first forming the silica precursor solution into a preform having a high surface area to volume ratio, then rapid drying or evaporating a solvent from the silica precursor solution. The mesoporous material may be in any geometric form, but is preferably in the form of a film, fiber, powder or combinations thereof. The rapid drying or evaporation of solvent from the solution is accomplished by forming a preform by any of layer thinning, for example spin casting; drawing; or spraying respectively.

It is critical to the present invention that the silica precursor solution avoid gelation or precipitation in order to permit formation of the mesoporous material by templating and evaporation of solvent(s). In a precipitation process, the composition of the mesoporous material is governed by a partitioning between the aqueous silica precursor solution and solid phases. In the evaporative process of the present invention, mesoporous material composition is directly related to the composition of the silica precursor because all of the non-volatile components of the precursor solution (namely the silica and the surfactant) are incorporated into the mesoporous structure. Therefore, in the present invention, the pore volume per gram of silica is controllable by varying the surfactant to silica precursor mole ratio in the silica precursor solution.

It is further critical to the present invention that the silica precursor be an alkoxide silica precursor, and that the mole ratio of an amount of a surfactant to the alkoxide silica precursor for templating be great enough to avoid producing a dense, non-porous film yet low enough to avoid producing a lamellar structure that is not calcineable, or any other non-calcineable structure. Left to themselves, some alkoxide silica precursor solutions will gel or precipitate over time if left alone from about 10 seconds to about 5 days or a week depending upon the solution. Thus, preforming must be done within a time before gelation or precipitation occurs. Finally, the rate of evaporation is critical to the formation of the mesoporous product. The slower the evaporation, the less ordered the mesopores. Accordingly, it is preferred that the solvent be evaporated or removed from the templated mesoporous structure in a time less than about 5 minutes, preferably less than about 1 minute, and most preferably less than about 10 seconds.

Production of a film is by layer thinning, wherein a layer of the silica precursor solution is formed on a surface followed by removal of an amount of the silica precursor solution and leaving a geometrically thinner layer of the silica precursor solution from which the solvent quickly escapes via evaporation. Layer thinning may be by any method including but not limited to squeegeeing and/or spin casting. Spin-cast mesoporous films are formed on the order of a minute or even seconds.

Advantages for the layer thinning method of the present invention include (1) films are formed within a minute (apart from time required for post-treatment and calcination), (2) no special atmospheres, pressures or supercritical drying equipment are required as in the case of aerogel film fabrication, and (3) the porosity is ordered, and of a controlled pore size rather than a random, gel-like structure in the case of aerogels and xerogels; the volume fraction of porosity and the structural order within the film are controllable by the silica to surfactant content or mole ratio. Further advantages are realized from thinning with a spin-coater, which is standard equipment in the microelectronics industry. Advantages of using a spin-coater include (1) films have uniform interference colors, indicating uniform film thicknesses (2) film thicknesses are repeatable from sample to sample (for example ±0.006 μm thick film, or a 1% variation) and controllable by varying the ethanol and water dilution and the spinning speed, and (3) the spin-casting technique does not require the use of large solution batches in which only a small fraction of the solution is used for film growth, as in the case of the earlier film growth technique for which the solution is depleted with film growth and must either be replaced or somehow regenerated. In the interfacial growth technique, bulk solutions of silicate and surfactant are used.

In powder formation by spray drying, the same conditions of fast drying exists as in spin-casting (as well as in fiber spinning) because of the high surface-area to volume ratio of the product. When a powder is produced by liquid spraying, the particles or micro-bubbles within the powder are hollow spheres with walls composed of mesoporous silica.

The volume within the interior of the mesoporous micro-bubble is undesirable for some applications including catalytic processes in which coking occurs. In these cases, the micro-bubbles may be broken by crushing or grinding. Mesoporous silica powders impregnated with catalytically active metals have applications in catalysis. The pore size, ~25–40 Å, allows access of large molecules to catalysis sites. The high surface area of the powders allows high catalytic activity. The surface area of mesoporous powders was determined to be ~900 $m^2/g$ by nitrogen absorption. The powders may be pressed or mixed with binders and extruded to produce pellets, tubes and other shapes for structured catalyst supports. Thus, the particle size in spray-drying may be controlled for a particular application. Because the micro-bubble walls are permeable, many applications such as micro-encapsulation is possible. Silica is ingestible. Containing a drug within the micro-bubble to allows passage through the stomach where it would normally degrade. The drug is released through the porous walls into the intestinal tract. Materials, including surfactants and polymers, adsorbed to either the outside of the bubble or within the pores can acts as pH-sensitive gates for the release of the drug.

Encapsulation may be done wherein a non-drug substance may be permanently caged within the bubble by closing off the pores with silane treatment, silica precipitation, or surfactant absorption.

Mesoporous fiber formation starts with a similar silica precursor solution but with an added pre-polymer making a pituitous mixture. The pituitous mixture is drawn into a thin strand from which solvent is evaporated leaving the mesoporous fiber(s). Mesoporous silica fibers may be impregnated with catalytically active metals for applications in structured catalytic packing. The small thickness, on the order of 10 to 100 μm, minimizes the diffusion distance from the bulk to the catalytic sites on the internal surface of the silica. The high aspect ratio of the fibers give the advantages of high throughput, combined with high reactive areas. The fibers may be wound or assembled in reactor modules. Hollow mesoporous fibers fabricated by rapid drying with heated gas (e.g. air) may be bundled into a module to form a catalytic membrane reactor. Reactants can flow through the hollow fiber and diffuse radially outward, through the mesoporous wall, past catalytically active sites. The reactor is especially useful for reactions where short contact times and good temperature control are required (e.g. partial oxidation). The temperature is uniform because reactions occur along the length of hollow fibers. The high surface area of the fibers allows high catalytic activity. The surface area of mesoporous fibers was determined to be ~1100 $m^2/g$ by nitrogen absorption. Mesoporous fibers have further use in high-performance thermal insulation. The pore size, ~25–40 Å, is such that transport of phonons of specific wavelength is reduced, limiting conductive heat transfer within the fiber.

It is an object of the present invention to provide a method of making mesoporous materials having high surface area to volume ratios.

It is a further object of the present invention to provide a method of making the mesoporous materials by solvent evaporation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
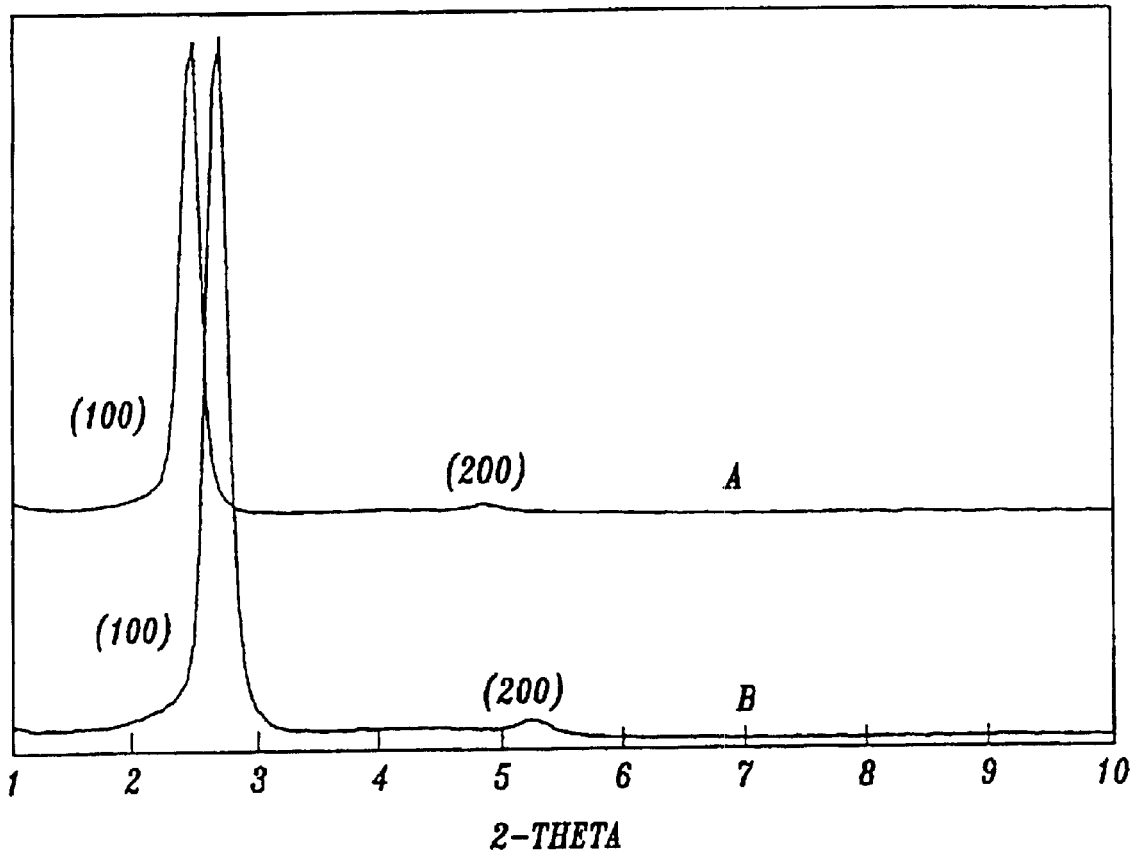
FIG. 1 shows XRD patterns for precalcined (A) and post calcined (B) mesoporous silica film.

The method of the present invention relies upon a silica precursor mixed with a surfactant in an aqueous solution for templating the silica precursor together with a catalyst (acid) for hydrolysis of the silica precursor. The silica precursor is then made into a preform that has a high surface area to volume ratio and the aqueous solution quickly evaporated to form the mesoporous material. The evaporative process for mesoporous material has the following steps: (1) the silica precursor in aqueous solvent is formed into a preform of high surface area to volume ratio (by spinning, drawing, atomizing) and (2) the solvent is quickly evaporated, leaving mesoporous silica in a similar shape (film, fiber, sphere). High surface area is necessary for fast evaporation of the solvent. A third step of heating may be used to remove any residual solvent and to further condense the silica, followed by calcining which further removes any residual surfactant.

The evaporation is fast in comparison to precipitation. With the preform having a high surface area to volume ratio, and with heated air, solvent is rapidly evaporated from the preform. Mesoporous materials are formed in less than five minutes, preferably less than one minute. For particles, a particle may be formed in less than one second (<<1 s). In a few minutes of spray drying, several grams of powder are produced. Dry powders are formed directly in the spray-dryer and no filtration step is required.

In spray drying, the precursor solution is atomized into fine droplets. Solvent evaporation leaves behind a shell of mesoporous silica. In spraying, the droplet size, and thus the mesoporous particle size, is controlled by modifying the rheological properties of the spraying solution (through solvent dilution or addition of polymeric thickeners) and by changing spray conditions (by the use of different nozzle geometries and varying solution pressure).

The silica precursor may be an alkoxide silica precursor or tetrachlorosilane. A preferred alkoxide silica precursor is tetraethyl ortho-silicate (TEOS). Other alkoxide silica precursors include orthosilicates, including but not limited to tetramethyl orthosilicate (TMOS), tetrapropyl orthosilicate, and tetrabutyl orthosilicate. Iso-propyl, sec-butyl and tert-butyl orthosilicates are included as well but may have limited commercial availability. In addition to the alkoxide, a metal halide salt may be added, especially a metal chloride as well as a metal nitrate. Metal halide salt(s) and/or metal nitrate(s) combine with the alkoxide. More specifically, iron chloride or nitrate, aluminum chloride or nitrate combines with the alkoxide. Additional metal(s) may be incorporated into the mesoporous silica structure. These additional metal (s) result in reducing solubility of the mesoporous silica structure and may impart a negative charge to the mesoporous silica structure.

A preferred surfactant contains an ammonium cation, either a quaternary ammonium cation, for example cetyltrimethylammonium chloride (CTAC), or a tertiary ammonium cation. Variations of CTAC as described by Huo (See Background) include substitution of ethyl and propyl groups for the methyl group that may also be used. In addition, it is possible to produce mesoporous materials using alkyl trimethylammonium chloride or bromide surfactants with different alkyl chain lengths. Variation in alkyl chain length (e.g. $C_{12}$, $C_{14}$, $C_{16}$, $C_{18}$) permits control of the pore diameter wherein shorter alkyl chain lengths produce smaller diameter pores.

An alternative method of varying pore size is by adding a swelling agent to the silica precursor solution. For example, addition of 1,3,5-trimethylbenzene produces pore diameters about 2–5 times greater than pores made without the swelling agent.

In the present invention, the mole ratio of templating surfactant (or surfactant) to alkoxide silica precursor is preferably from about 0.05 to about 0.3. Below about 0.05, a dense, non-porous silica phase is produced and above about 0.3, a lamellar phase is produced that is not calcineable. The lamellar phase is not calcineable because the lamellar structure collapses upon removal of the surfactant that occurs during calcination. Specifically for CTAC/TEOS, the mole ratio is preferably less than about 0.24. More specifically, with a mole ratio of between about 0.1 to about 0.15, the pores are well ordered. However, at high ratios, above 0.24, specifically from about 0.26 to 0.28, give high pore volume fraction and high specific surface area (e.g. 1770 $m^2/g$), surprisingly higher than reported in the prior art.

In the present invention, the mole ratio of water to silica precursor is preferably greater than or equal to a stoichiometric ratio. More preferably the ratio of water to silica precursor is about 7. Use of stoichiometric or super stoichiometric amounts of water is believed to help preserve the hexagonal structure of the product upon calcination.

Control of the morphology on the micrometer scale is also unique to the evaporative process. In spin casting, a flat substrate flooded with the precursor solution is accelerated to high rpm. Excess solution flows off during spinning, leaving a thin film of the solution which forms a solid mesoporous film by evaporative concentration. Films may be deposited on no-flat surfaces by spraying, painting or dip coating. It should be noted that according to the present invention it may be advantageous to insure that the substrate surface is hydrophilic. For silicon wafer substrate, a hydrophilic surface may be obtained by sonication in deionized (d.i.) water, followed by soaking in a solution of sulfuric acid and finally rinsing with d.i. water and drying.

In fiber spinning, the precursor solution (mixed with high molecular-weight polymer) is drawn into a strand. The solution evaporates leaving the mesoporous fiber. Drawing may be either by contacting an object to the precursor solution and moving the object away and forming a strand of precursor solution, or by permitting the precursor solution to flow from a vessel under pressure or by gravity. Flow under pressure may include extrusion.

In the hydrolysis of the silica precursor, tetrahydroxysilane is produced which undergoes condensation reactions to form silica oligomers. With the alkoxide silica precursor, an alcohol is a byproduct of hydrolysis. With the tetrachlorosilane precursor, hydrochloric acid is a byproduct.

EXAMPLE 1

An experiment was conducted to demonstrate making mesoporous films by the method of the present invention.

Silicon wafers were obtained from Silicon Source and cut into 2.5×2.5 $cm^2$ squares. The silicon wafers were pretreated by sonication in deionized (d.i.) water, followed by soaking overnight in a solution of sulfuric acid and Nochromix™ (Godax Labs) and finally rinsing with d.i. water and drying by aspiration.

The silica precursor solution had the mole ratios of TEOS (Aldrich) 1.0; deionized water 7.2 (18 MΩ resistance); ethanol (punctilious; Quantum Chemicals) 5.7; HCl (Mallinckrodt) 0.10. The (CTAC) (T.C.I. America) was added after hydrolysis. CTAC/TEOS mole ratio was varied from 0 to 0.30 to determine its influence on film properties.

Spin-castings were performed with a Specialty Coating System Model P-6204A spin coater. With the silicon wafer at rest, the entire top surface of the silicon wafer was covered with the hydrolyzed TEOS-surfactant solution. The covered silicon wafer was spun at 4000 rpm for 60s with maximum acceleration (spin-up time <1s). A substantial amount of the hydrolyzed TEOS-surfactant solution flowed off the covered silicon wafer during rotation. The remaining solution was geometrically at a high surface area to volume ratio. Flowing ceases as the viscosity of the hydrolyzed TEOS-surfactant solution increases because of the increased concentration of silica precursor and surfactant from loss of solvent through evaporation.

The precalcined mesoporous silica film was post treated with ammonia vapors which improved the stability of the pore structure after calcination. A few drops of ammonium hydroxide were put in a closed petri dish containing the spin coated silicon wafer. The spin coated wafer was ammonia treated for about 15 minutes.

The spin coated silicon wafer was removed from the ammonia treatment then heated to 105° C. for several hours to complete drying of the solvent and increase condensation of the silica. Finally, the dried spin coated silicon wafer was calcined at 550° C. for 5–10 minutes.

The mesoporous silica film was characterized by X-ray diffraction and ellipsometry. FIG. 1 shows XRD patterns of the film before calcination A and after calcination B for a CTAC/TEOS mole ratio of 0.12. The (100) and (200) reflections are apparent. The absence of the (110) reflection suggests orientation of the c-axis parallel to the substrate (silicon wafer) surface. The increase in the peak heights of the reflections after calcination B was believed to result from the increased differences in scattering density between the silica walls and the pores after the surfactant was burnt out. The peak width (the full width at half maximum) of the (100) reflection was nearly constant with calcination, indicating the stability of the mesoporous structure. The peak height was also a qualitative indicator of a well-ordered film structure. The d-spacing of the first diffraction line for the hexagonal structure is 33 Å after calcination. Consolidation of the silica with calcination caused a 3 Å contraction in the (100) reflection. Calcined mesoporous silica films having d-spacing less than 40 Å have not been achieved prior to the present invention (see FIG. 2). Preferably the d-spacing is less than 39 Å, more preferably less than 38 Å, and most preferably less than 37 Å.

Figure 2:
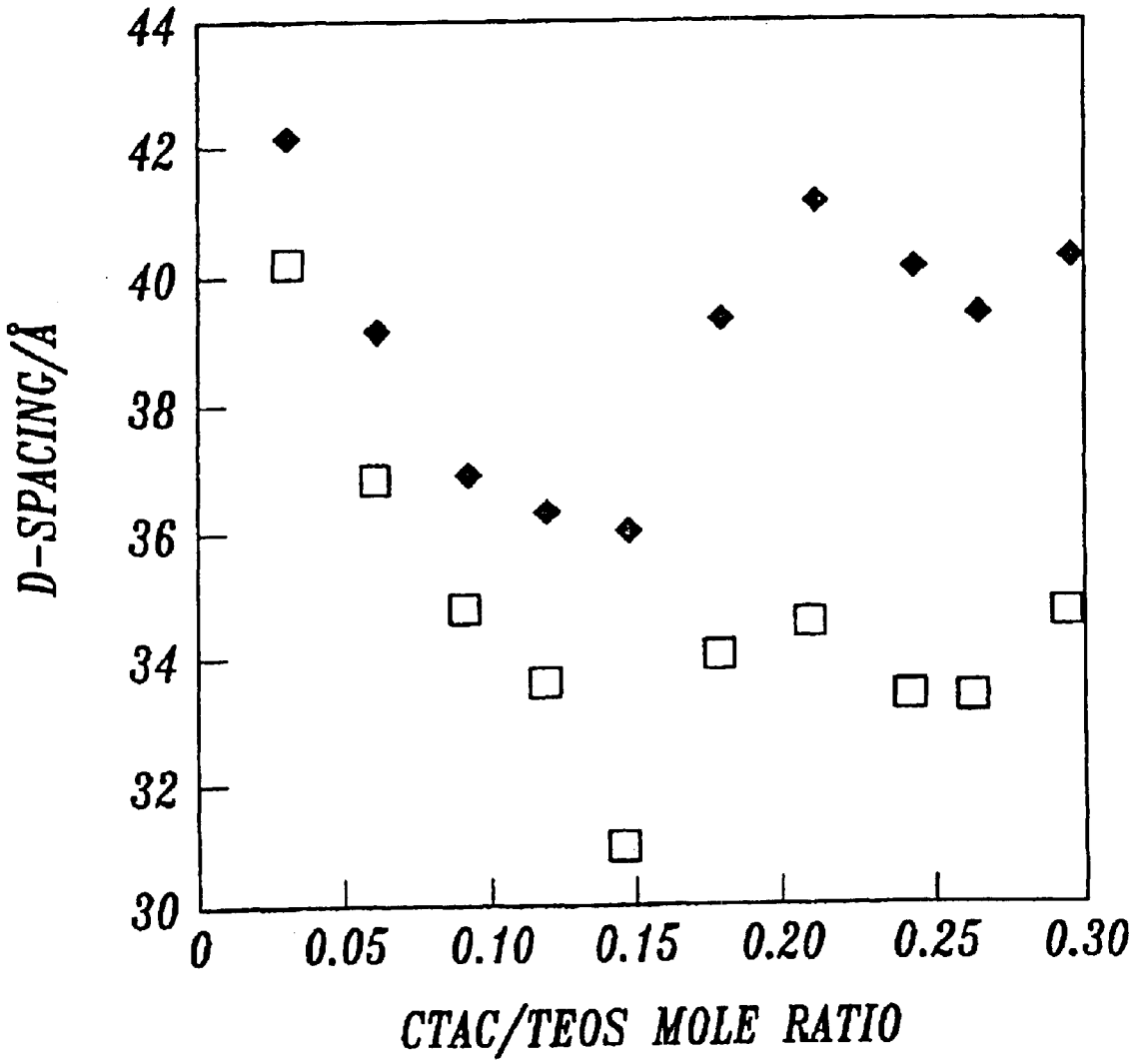
FIG. 2 shows the d-spacing for the precalcined (solid diamonds) and post calcined (open squares) mesoporous silica films.
Figure 3:
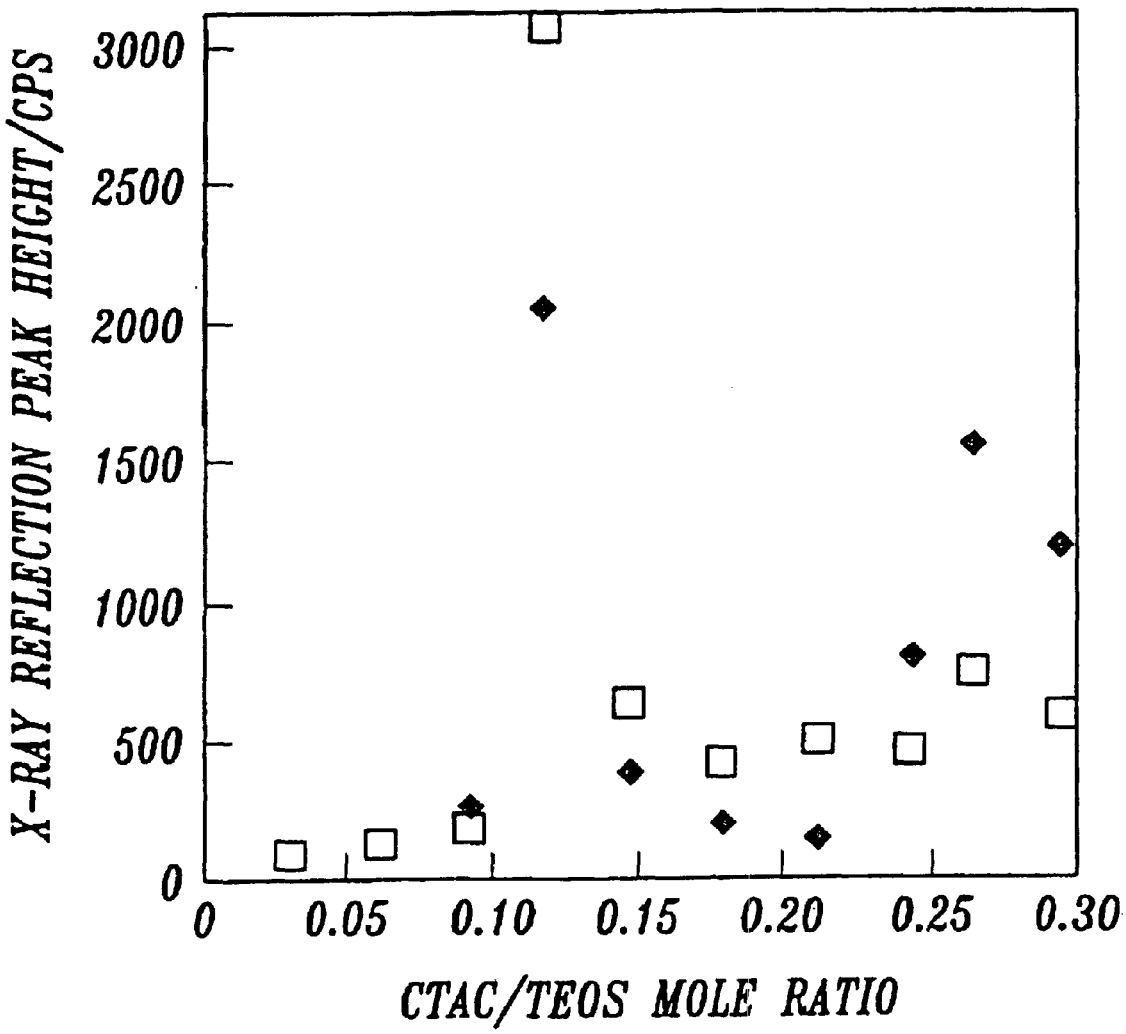
FIG. 3 shows the XRD primary reflection peak height for the precalcined (solid diamonds) and post calcined (open squares) mesoporous silica films.

FIG. 2 shows the d-spacing of the primary X-ray reflection, before and after calcination, as a function of the CTAC/TEOS mole ratio. No reflections exist for the film without surfactant. With an increasing mole ratio up to 0.15, the d-spacing of the un-calcined film monotonically decreases down to 36 Å. Above a ratio of 0.15, the d-spacing abruptly increases to 39–41 Å and is roughly constant at higher surfactant concentrations. The peak height of the primary reflection, which is a qualitative indicator of structural ordered, is shown in FIG. 3. In the mole ratio range between 0.1 and 0.15 a maximum existed, demonstrating that order was improved by optimizing the CTAC/TEOS mole ratio. The pores were in a well-ordered hexagonal lattice. In the mole ratio range of >0 to 0.21, the porosity was thermally stable; the peak height either increased or remained constant after calcination. For ratios ~0.24 and above, the peak height for the un-calcined film was large. However, the films had a cloudy appearance and would not be suitable for many applications. The drop in the peak height and the increase in the peak width (not shown) after calcination indicate poor thermal stability. Therefore, the desired CTAC/TEOS mole ratio range is less than 0.24.

Figure 4:
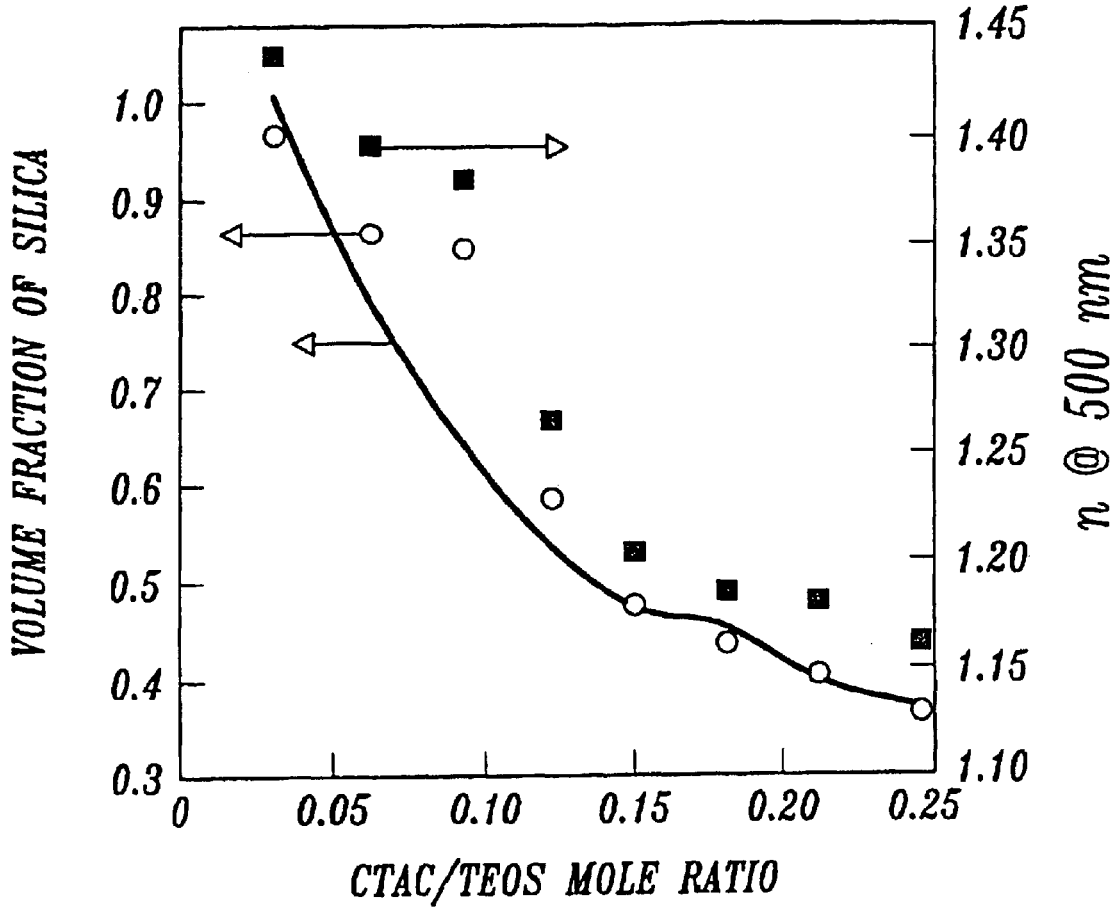
FIG. 4 shows the volume fraction (open circles) and index of refraction (solid squares) for the calcined mesoporous silica films.

Although the pores were hexagonally ordered within a narrow composition range, within a broader range the films were thermally stable and the porosity may be fine-tuned by adjusting the CTAC/TEOS ratio. FIG. 4 shows the volume of silica, determined by ellipsometry, of calcined films as a function of the CTAC/TEOS mole ratio. The solid curve is the expected volume fraction based on the volume contributions of the silica and the surfactant and the volume shrinkage indicated by shifts in the positions of the X-ray reflections after calcination. The correspondence of the curve with the data demonstrates that the same CTAC/silica mole ratio existed in the film as in the spin-casting solution. Pore volumes up to ~64 vol % (~36% silica) were measured in films prepared with a CTAC/TEOS ratio of 0.20.

FIG. 4 also shows the index of refraction at a 500 nm wavelength of calcined films as a function of the CTAC/TEOS mole ratio. The index of refraction gives an indication of the dielectric constant because the square of the index of refraction is the dielectric constant at high frequencies. The data shows the index of refraction (and the dielectric constant) is tunable by varying the CTAC/TEOS mole ratio. The index of refraction values ranging from that of silica down to 1.16. Ellipsometry was performed immediately following heat treatment at 450° C. For the most porous sample, the index of refraction increased less than 1% over one week in ambient air.

Calcined films were characterized by X-ray photoelectron spectroscopy with analyzed volume on the surface of approximately 1×1 $mm^2$ in area and 20 to 40 Å in depth. Silicon, oxygen and a small amount of adventitious carbon were identified. Within the resolution of the equipment, no chlorine nor nitrogen were found, demonstrating that calcination yields relatively pure silica without contamination from other chemicals used in the process. Cross-polarized optical microscopy of films deposited on glass slides, before and after calcination, did not reveal liquid crystalline-like optical anisotropy. Atomic force microscopy of the mesoporous film (not shown for brevity) revealed a surface morphology dominated by undulations ~1 μm in diameter and raised rims ~0.1 μm in width. Height variations were within 60 nm. The film was continuous and not the result of the deposition of pre-existing particles.

EXAMPLE 2

An experiment was conducted to demonstrate that quick drying was important to the film structure.

Silicon wafers were pre-treated in the manner described in Example 1.

The silica precursor solution had mole ratios of deionized water 7.1; ethanol 5.4; HCl 0.1; TEOS 1.0; and CTAC 0.11.

Spin castings were performed in the manner described in Example 1. The remaining silica precursor solution was evaporated by natural convection in an open glass bottle. The spin coated wafer and the evaporated silica precursor solution were not post treated with ammonia vapors. The spin coated silicon wafer and evaporated silica precursor solution were heated to 105° C. for several hours.

Figure 5:
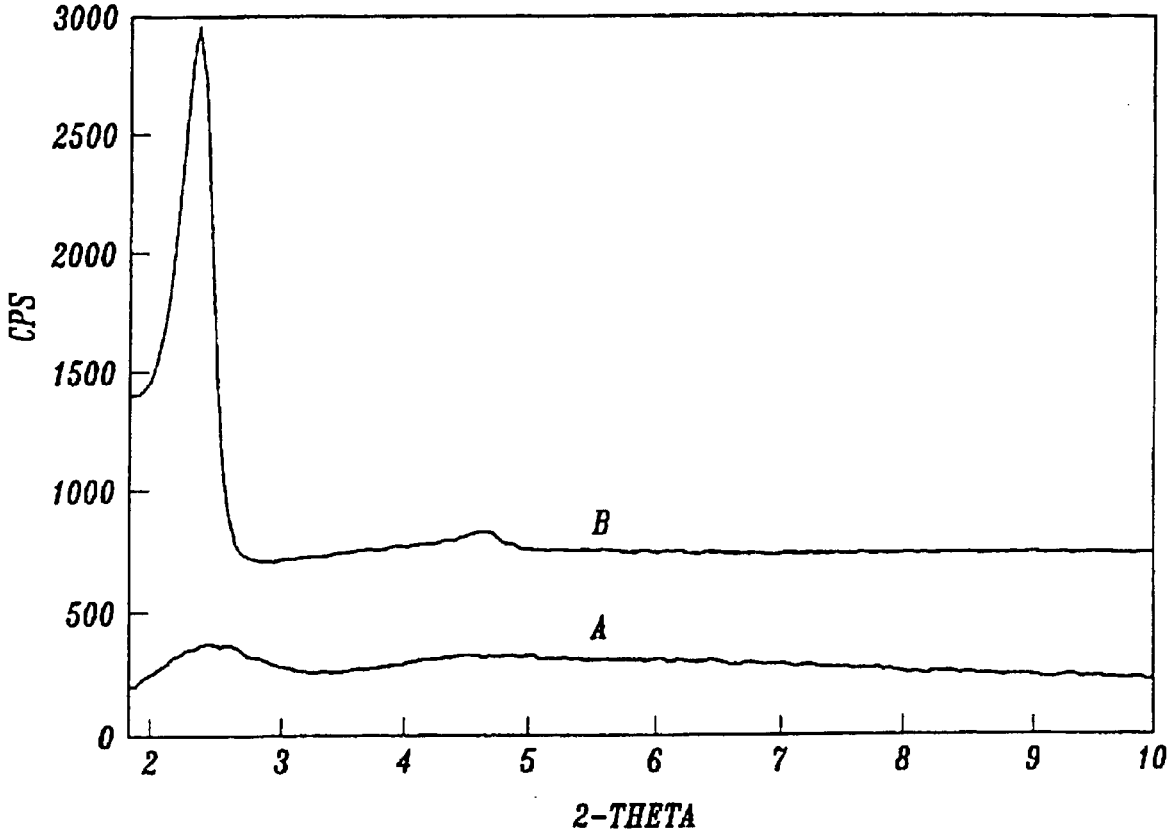
FIG. 5 shows (A) the PXRD pattern for the evaporated silica precursor solution and (B) the XRD pattern for the mesoporous silica film.

The mesoporous silica film and the evaporated silica precursor solution were characterized by XRD. FIG. 5 shows the XRD pattern for the mesoporous material film and the PXRD pattern for the evaporated silica precursor solution. The mesoporous silica film has a strong primary reflection, a qualitative indicator of structural order. The evaporated silica precursor solution has only a broad peak of very low intensity and thus exhibits poor pore ordering. These results demonstrate that silica precursor solutions evaporated by natural convection do not yield ordered mesoporous silica.

EXAMPLE 3

An experiment was conducted to demonstrate making mesoporous material powder. The silica precursor solution was prepared with the following composition by mass:

TEOS 51.80 g; water 26.264 g; 38 wt % hydrochloric acid 1.756 g; and CTAC 10.333 g. TEOS, deionized water and HCl were first combined together, following by addition of CTAC. Normally immiscible, TEOS combines with water in the presence of the surfactant, allowing the hydrolysis reaction to occur. The solution became hot upon mixing from the exothermic hydrolysis; the sample bottle was cooled under running water.

In Example 1, ethanol was used to dilute the precursor solution for spin casting. However, in the spray-drying process, potential explosion or flammability hazards from either added flammable solvents or the ethanol reaction by-product must be minimized. Hence, no ethanol dilution was used because of the potential hazards. Instead of ethanol, water was used for dilution, hydrolysis, and solvent for the surfactant.

The precursor solution was spray-dried in a Büchi-190 Mini Spray Dryer operating with an inlet air temperature of 174° C., an outlet temperature of 76° C., a pump speed setting of "5," a heat setting of "13," an airflow setting of 300 and a gate valve setting between ¼ and ½. The precursor solution was pumped through a water-cooled nozzle into a flow of heated air and down the length of a ~30 cm drying tube. The solvent in the droplets of the spray quickly evaporate, leaving behind the nonvolatile material in the particulates which are collected at the bottom of a venturi separator. It takes on the order of a second for material to pass through the spray nozzle and be collected.

The powder was heated at 105° C. for ~2 h, followed by calcination at 600° C. for ~30 min. The absence of ammonia treatment for this powder demonstrates that ammonia is not required for producing a calcineable material. After calcination, the powder lost 40.6% of its mass, compared with a theoretical mass loss of 40.9% based on the precursor solution composition (assuming silicon exists in the form of $SiO_2$ and each surfactant molecule has a chloride counter-ion). The close agreement between the experimental and theoretical values supports the assertion that, in the rapid drying process, the mesoporous solid composition is directly determined by the solution composition, and all of the nonvolatile species are incorporated into the solid.

Figure 6:
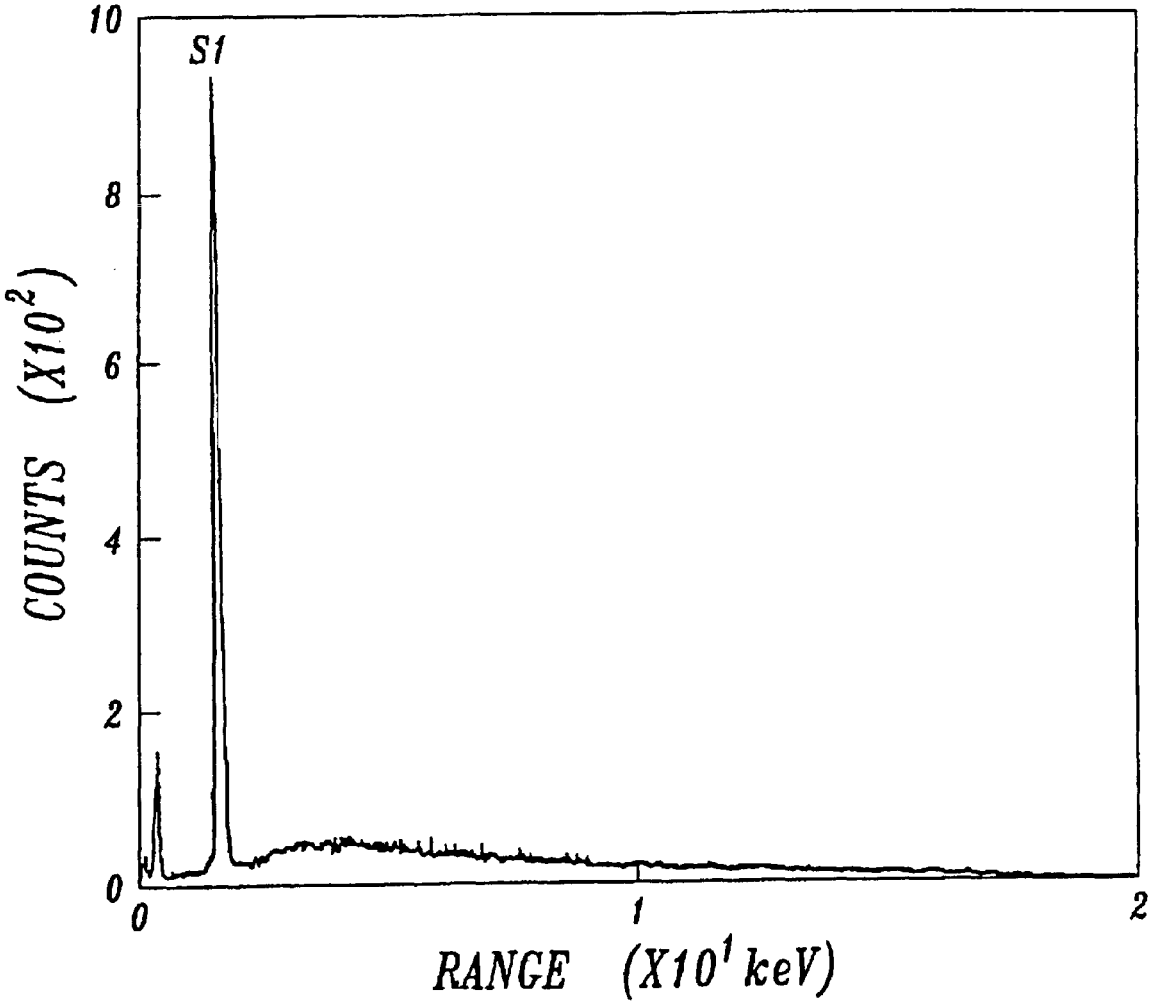
FIG. 6 is a XDS of the mesoporous silica powder particle.

Scanning electron micrographs of the spray-dried mesoporous silica after calcination showed that the particles were in the form of hollow spheres or shells with diameters ranging from approximately 4 to 40 μm (micron). Potentially, hollow spheres may range in size from about 1 μm to about 300 μm. The wide range of particle size was probably due to non-uniform atomization from the spray nozzle. The hollow nature of the particles was evident by the fraction of collapsed particles which have the appearance of deflated balls. From the width of the folds in the collapsed particles, the thickness of the particle bubble shell was estimated to be less than 0.5 μm. Electron dispersive X-ray analysis confirmed the calcined particle micro-bubbles were composed only of silicon and oxygen (see FIG. 6).

A surfactant-silica solution has been spray dried into a powder. X-ray diffraction data of calcined powder clearly showed the existence of mesoporosity by a low-angle primary peak corresponding to a d-spacing of ~31 Å.

Figure 7:
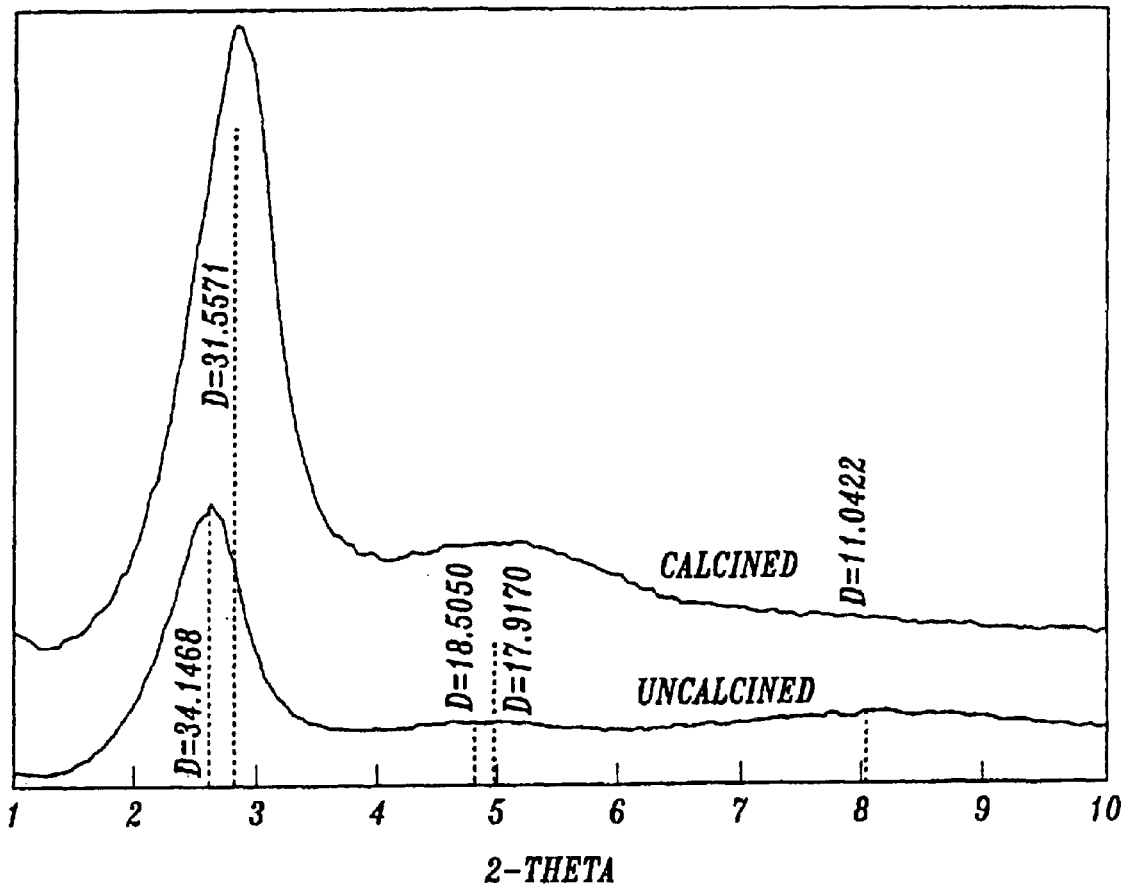
FIG. 7 shows PXRD patterns for precalcined and post calcined mesoporous silica powder.

FIG. 7 shows powder X-ray diffraction (PXRD) patterns in the low-angle range of the powder sample prior to and after calcination. The primary peak, corresponding to a d-spacing of 34 Å, prior to calcination indicates the average spacing between reflection planes. After calcination, the primary peak corresponds to a d-spacing of 31 Å due to shrinkage. The existence of the primary peak after calcination demonstrates that the pores are stable with calcination. The intensity of the reflections was higher after calcination which is probably a result, in part, of the increase in the scattering density contrast after surfactant burnout.

In the PXRD pattern of the powder after calcination, a second peak of low intensity at 5.1°, corresponding to a d-spacing of 17.3 Å, corresponding to a d-spacing of 17.3 A, is apparent. The (110) and the (200) reflections were not clearly resolved.

EXAMPLE 4

An experiment was conducted to demonstrate mesoporous silica fibers. Poly(ethyleneoxide) (PEO) with a MW of $5\times10^6$ was mixed with 18 MΩ deionized water to form a 3.7 wt % stock solution and was allowed to dissolve overnight. The pituitous mixture was prepared with the following composition by mass: TEOS 8.02 g; water 3.60 g; 38 wt % hydrochloric acid 0.39 g; CTAC 1.71 g, and 3.7 wt % PEO solution 1.26 g. TEOS, deionized water and HCl were first combined together, followed by CTAC. The solution became warm upon mixing from the exothermic hydrolysis; the sample bottle was cooled under running water. The PEO solution was then added to modify the rheology of the silica/CTAC solution to allow drawing of fibers.

Fibers were drawn onto a spindle with four wooden dowels. The dowels were covered with parafilm™, on which fiber samples were collected. The spindle was driven either by hand or by an electric hand drill attached by the drill chuck to the end of the metal rod. A thin, stream of solution, was drawn up from the solution with a pipet tip, and wound onto the spindle. The rotating spindle served to collect, pull and rapidly dry the fibers. After drawing, the fibers were peeled away from the dowels and collected in a crucible.

The fibers were ammonia treated for ~1h by dripping a few drops of ammonium hydroxide solution onto a tissue taped to underside of a cover and placing the cover over the crucible containing the fiber sample. The ammonia vapor raises the pH in the fibers, and increases condensation of the silica and improves the stability of the porous silica structure during subsequent high-temperature calcination. The fibers were placed in an oven at 105 to 180° C. for several hours, followed by heat treatment at 600° C. for ~1 h. The fully calcined fibers were white, presumably due to opacity arising from large defects incorporated during the hand-drawing procedure. The mass loss after calcination was 55% compared with an expected value of 57% calculated based on the amount of $SiO_2$, CTAC, and polymer that would be obtained from the pituitous mixture.

The diameter of the fibers varied from 5 to 100 μm with a range of 35 to 60 μm being more typical. Fibers with small diameter of ~10–30 μm are desirable because of better bending endurance and weavability. Small diameters are easily achieved with state-of-the-art fiber drawing (extrusion) equipment.

Figure 8:
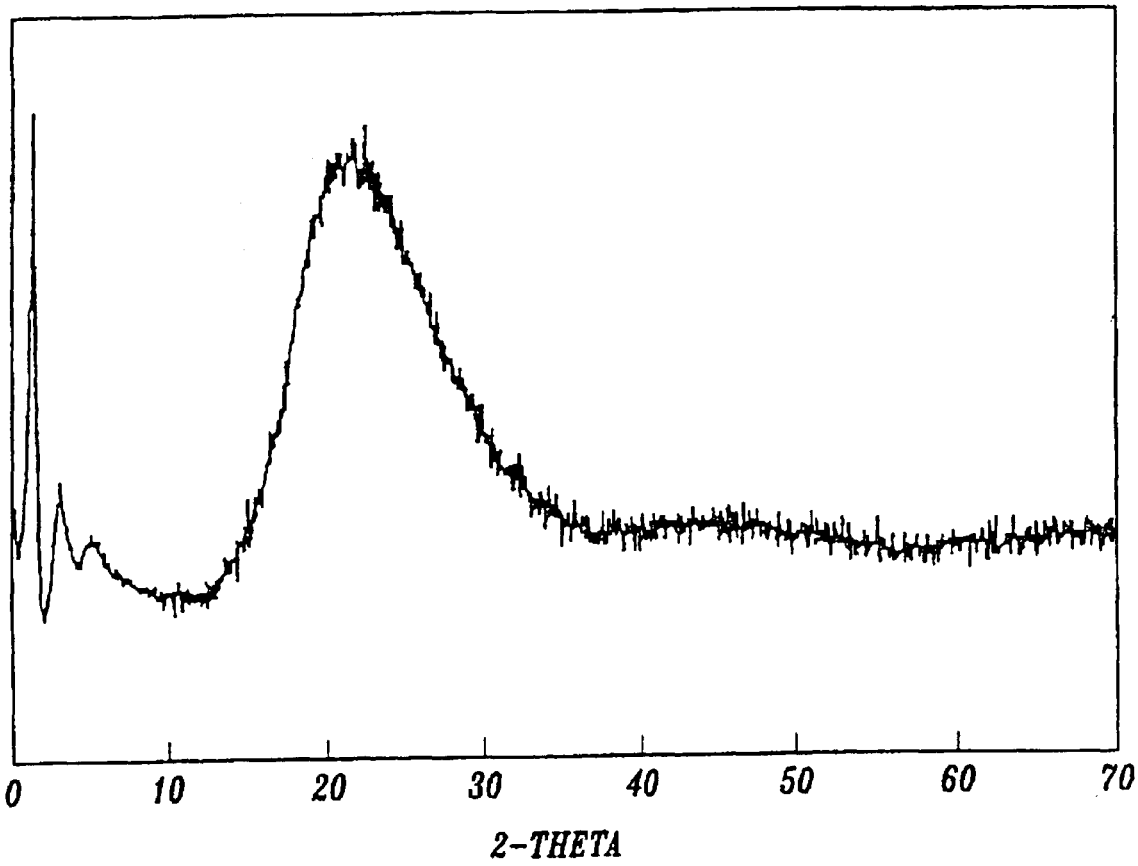
FIG. 8 is a PXRD pattern for the precalcined mesoporous silica fiber.

Fibers were ground with a mortar and pestle and characterized by powder X-ray diffraction (PXRD). FIG. 8 shows the PXRD pattern of fibers prior to calcination along with the pattern for the as received PEO. The broad amorphous peak centered at a 2θ value of 21° corresponds to silica. As received PEO is crystalline. However, no crystalline peaks are observed, indicating the polymer is dispersed within the fiber material.

Figure 9:
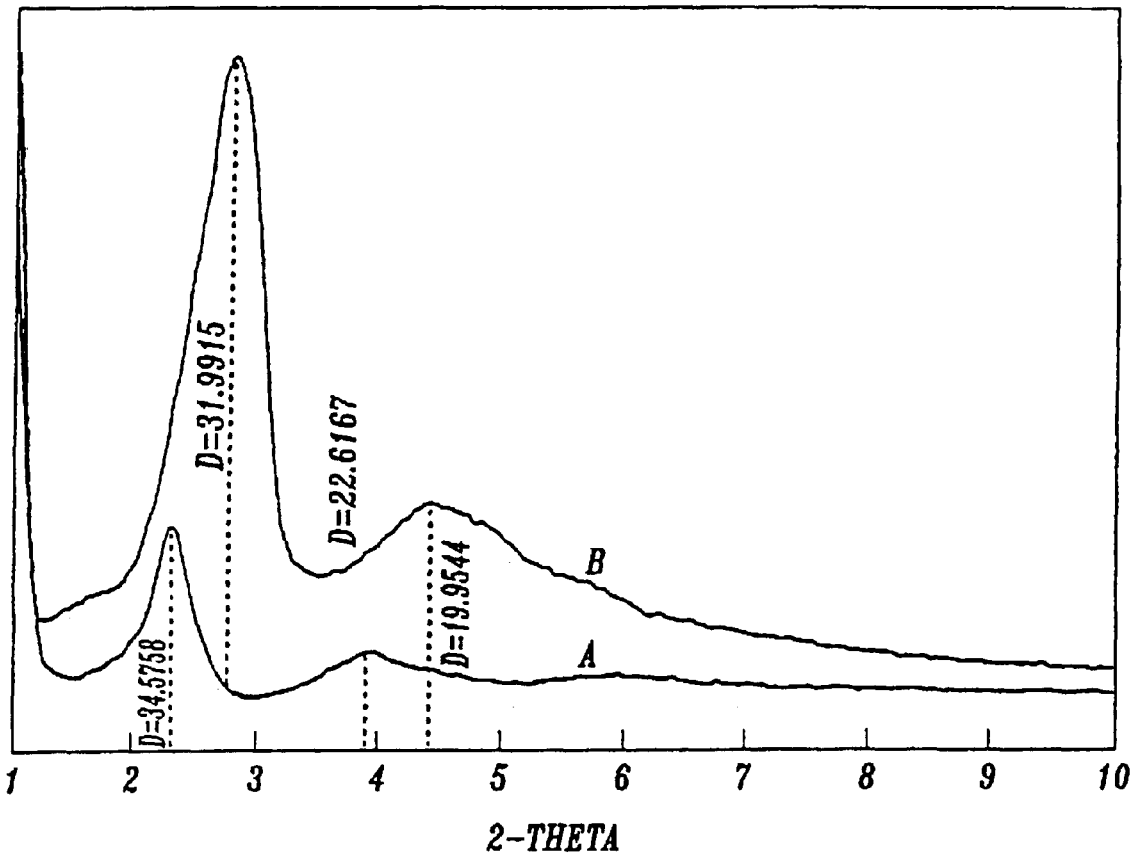
FIG. 9 shows PXRD patterns for precalcined (A) and post calcined (B) mesoporous silica fiber.

FIG. 9 shows the PXRD patterns in the low angle range of the fiber sample prior and after calcination. The primary peak at 2.3°, corresponding to a d-spacing of 38 Å, prior to calcination indicates the average spacing between reflection planes. After calcination the primary peak shifts to 2.8° (32 Å) due to shrinkage. The existence of the primary peak after calcination demonstrates the pores are stable with calcination. The intensity of the reflections is higher after calcination which is probably a result of the increase in the scattering density contrast after surfactant and polymer burnout. A similar intensity increase after calcination was observed for the mesoporous films described in Example 1.

A second peak at low intensity at 3.9°, corresponding to a d-spacing of 23 Å, (4.4° or 20 Å after calcination). The (110) and (200) reflections are not clearly resolved similar to the mesoporous powder XRD pattern from example 3. The pore ordering in the fibers is improved by varying the CTAC/TEOS mole ratio and by drawing smaller diameter fibers.

TEM photos confirm a well ordered mesoporous structure within the fibers. Cross-polarized optical microscopy of the calcined fibers revealed liquid crystalline-like optical anisotropy.

EXAMPLE 5

An experiment was performed to demonstrate incorporation of aluminum into the mesoporous silica film.

Silicon wafers were pre-treated in the manner described in Example 1.

The aluminosilicate precursor solutions had mole ratios of deionized water 7.3; ethanol 5.3; HCl 0.09; CTAC 0.14; TEOS 1.0. The mole ratio of aluminum nitrate (Al(NO3)3 9H2O) to TEOS mole ratio was varied between 0.035 to 0.25. The solutions were prepared by combining deionized water, ethanol, hydrochloric acid, CTAC and aluminum nitrate together, followed by the addition of TEOS.

Spin castings were performed in the manner described in Example 1.

The spin coated wafers were not post treated with ammonia vapors.

The spin coated wafers were heated and calcined in the manner described in Example 1.

The calcined mesoporous aluminosilicate films were characterized by XRD in a 2-theta range of 1–10°. XRD results for the primary reflections are summarized in Table E6-1. With increasing Al/TEOS mole ratio, the d-spacing of the primary reflection decreased. The calcined mesoporous aluminosilicate film with a Al/TEOS mole ratio of 0.064 had the greatest primary reflection peak intensity. However, an Al/TEOS mole ratio of 0.064 should not be considered an optimum value for a well-ordered film structure because the pore ordering is also dependent on the surfactant content in the aluminosilicate precursor solutions. The dependence of the pore ordering on the CTAC/TEOS mole ratio was demonstrated in Example 1 for mesoporous silica films without aluminum. In the XRD patterns of the calcined mesoporous aluminosilicate films with Al/TEOS mole ratios of 0.035, 0.064 and 0.13, reflections of low intensity were observed at half the d-spacing of the primary reflection.

TABLE E6-1

XRD results for the primary reflections

| Al/TEOS mole ratio | d-Spacing/Å | Peak Intensity/cps |
|---|---|---|
| 0.035 | 35 | 2800 |
| 0.064 | 30 | 9700 |
| 0.13 | 27 | 6400 |
| 0.25 | 25 | 1700 |

To identify possible crystalline phases distinct from the amorphous pore walls, the calcined mesoporous aluminosilicate film with an Al/TEOS mole ratio of 0.25 was characterized by XRD in a 2-theta range of 5–30° using a slow scan rate (0.04°/75 s). A wider 2-theta range was not used because of the strong reflections from the silicon wafer substrate above 30°. A low intensity peak with a d-spacing of 4.02 Å was observed. The only possible matching reference data for the Si—Al—O—H system was for cristobolite (SiO2). Therefore, the XRD pattern did not show a separate aluminum-oxide crystalline phase.

The calcined mesoporous aluminosilicate film with a TEOS/Al mole ratio of 0.25 was characterized by SEM. The calcined mesoporous aluminosilicate film was homogeneous; no crystal gains were observed. A small amount of surface roughness was observed which had the same appearance of the AFM image discussed in Example 1. EDS characterization of the calcined mesoporous aluminosilicate film showed the presents of aluminum. The EDS characterization was not quantitative because of significant penetration of the electron beam through the calcined mesoporous aluminosilicate film and into the silicon wafer substrate.

EXAMPLE 6

Dry-Spun Mesoporous Fibers

An experiment was conducted to demonstrate making well-ordered mesoporous fibers by the method of the present invention.

The spinning solution was formed by combining deionized water, hydrochloric acid (Mallinckrodt), $5\times10^6$ MW poly(ethylene oxide) (PEO) (Polysciences) from a 4 wt % aqueous stock solution, ethanol (punctilious, Quantum Chemicals), followed by TEOS (Aldrich). The solution was mixed to promote the hydrolysis reaction. Finally, CTAC was added to obtain final mole ratios of: 7.0 $H_2O$, 0.050 HCl, 0.10 PEO (repeat unit), 4.0 ethanol, 1.0 TEOS, 0.24 CTAC. A thin strand of the pituitous solution was drawn from a pipette tip, and wound at a rate of 300 m/min onto a spool consisting of six dowels. Fibers were air dried at 105° C. overnight, and calcined by heating at 350° C. for 1 h and 600° C. for 3 h.

Samples were analyzed by powder X-ray diffraction using a Philips diffractometer with Cu Ka radiation. Pore-size distributions and BET surface areas were determined from nitrogen adsorption/desorption isotherms with the Quantachrome Autosorb 6-B gas sorption system, using the BJH and multi-point BET methods, respectively.

Mesoporous fibers were dry spun by drawing the precursor solution into continuous filaments and collecting on a spool. Fibers crossing on the spool during spinning tend to fuse together, creating a gauze-like product at the end of spinning which was cut away in sections from between the dowels. The as-spun fibers were pliable and pressable into pellets or rolled into tubes. With drying and calcination the fibers become brittle. Low temperature oven drying promotes condensation between silica oligomers and increases calcination stability of the silica phase. During calcination, silica undergoes further condensation; surfactant and polymer are removed, leaving the porous structure. The mass loss of 59% after calcination compared to a value of 57% calculated from the spinning solution composition, assuming the dried fibers contain $SiO_2$, PEO, and surfactant with chloride bridging-ions (for the powders, mass losses were within 1% of the calculated values). The excess loss was attributed to incomplete drying/silica condensation prior to calcination.

A scanning electron micrograph of these calcined fibers showed fiber diameters are on the order of 40 μm and where varied by modifying solution composition and spinning conditions. The distribution of fiber diameters was due to the hand spinning technique presently used; more uniform fibers are achievable with state-of-the-art spinning equipment. The fiber cross sections typically had a kidney-shape, characteristic of dry-spun fibers where high evaporation rate at the air-fiber interface and comparatively slow solvent diffusion rates through the fiber caused the skin to collapse around the soft cores. Self-assembly of silica and surfactant occurred first at the air-fiber interface, followed by progressive conversion of the entire fiber to a mesophase structure. The mesoporous products do not form by the aggregation of preexisting mesoporous particles. Precursor solutions are clear, typically stable for several days, and eventually gel rather than form particles, as in the acid-route synthesis of Huo et al. Chem. Mater. 1994, 6, 1176–1191.

Figure 10:
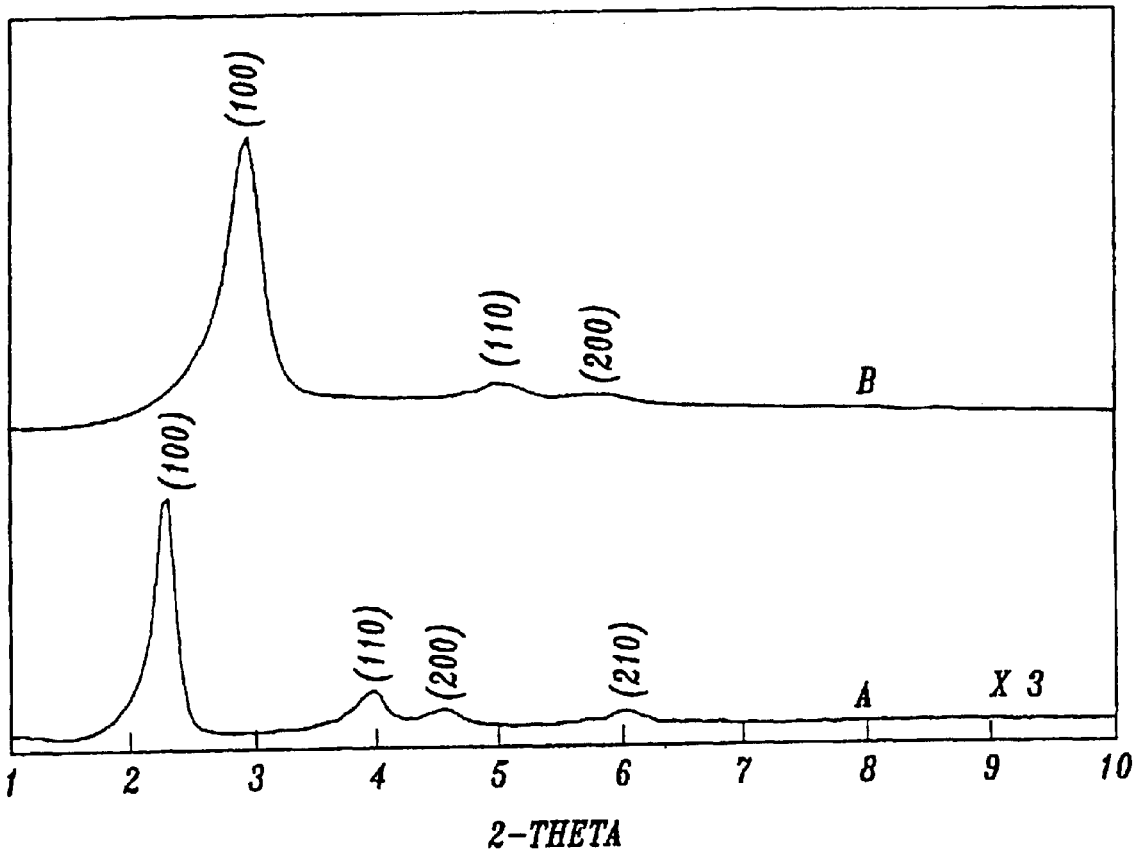
FIG. 10 shows PXRD patterns of mesoporous silica fibers where trace A is air-dried fibers and trace B is calcined fibers.

Powder X-ray diffraction (PXRD) patterns of the dried and calcined fibers are shown in FIG. 10. The (100), (110), (200), and (210) reflections corresponding to a hexagonal structure are visible in the PXRD pattern for the dried fibers, although only the first three reflections are visible for the calcined fibers. The increase in peak intensity after calcination (note scale indicated on FIG. 10) is due to the greater scattering density contrast and reduced X-ray absorbance after surfactant and polymer removal. The increase is not due to enhancement of pore ordering. To the contrary, the loss of the (210) reflection, along with a peak-width increase of the (100) reflection, indicates partial loss of order. The $d_{100}$ value of the fibers decreased from 39 Å to 30 Å on calcination, a decrease comparable to the measured linear shrinkage of 25%.

Figure 11:
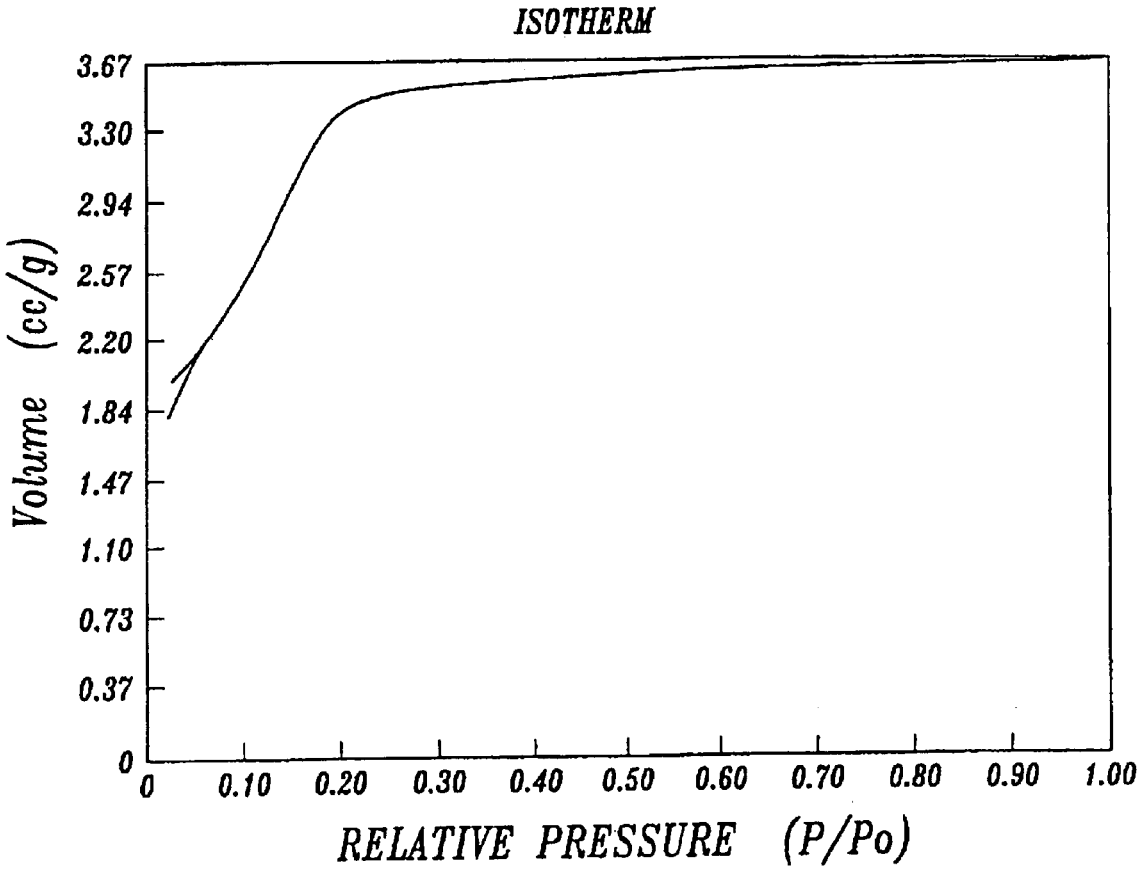
FIG. 11 shows nitrogen adsorption/desorption curves for the mesoporous fibers.
Figure 12:
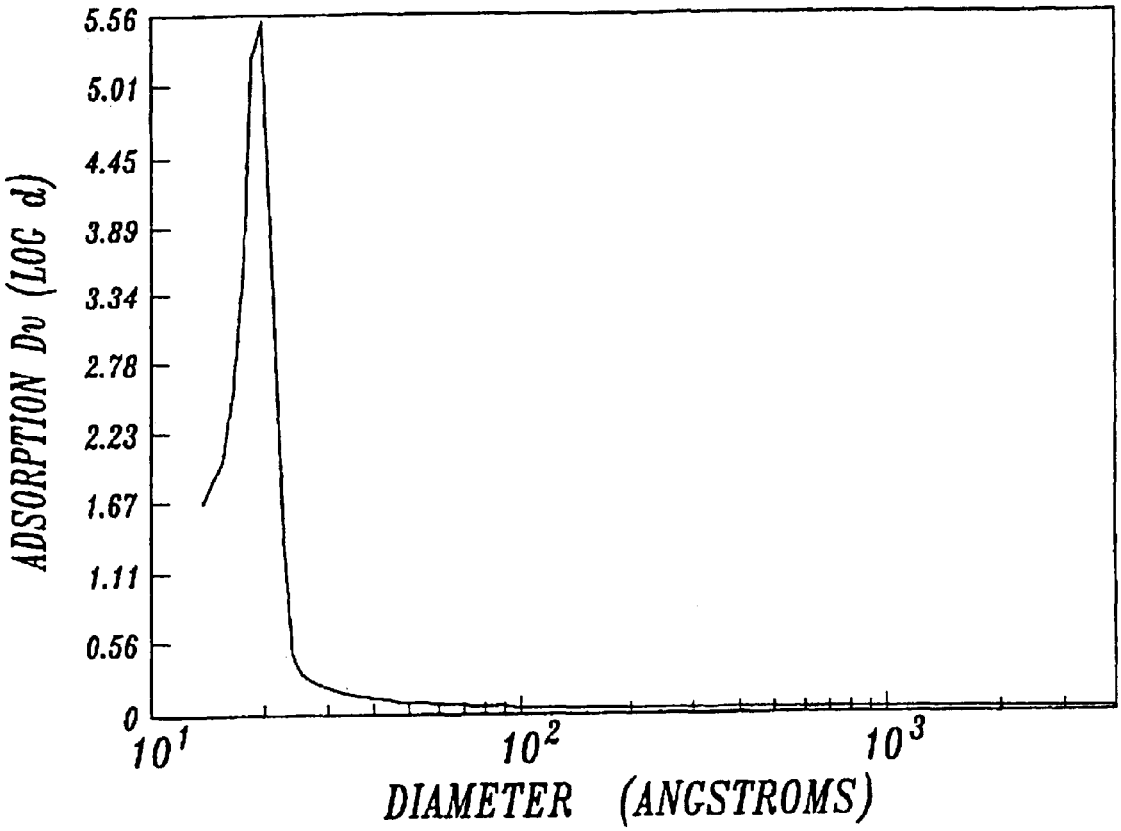
FIG. 12 shows pore-size distribution of the mesoporous fibers.

By nitrogen-adsorption analysis, the mesoporous fibers have a surface area of 1100 $m^2/g$ and a 20 Å pore diameter (see FIGS. 11,12). Though the pore size was smaller than that of MCM-41 materials, because of calcination shrinkage, the total surface area is comparable. The adsorption/desorption isotherms showed no hysteresis within the resolution of the equipment, indicating that the pores were unconstricted. The hydrophilic polymer is presumably dispersed within the silica phase (no crystalline XRD peaks are observed in the dried fibers). However, there appears to be no residual porosity from pyrolysis of the polymer; the adsorption data showed no evidence of a micropore contribution. The volume fraction of mesoporosity was 54%, which correlates well with the 57 vol % porosity calculated from the volume contributions of the surfactant and silica phases, after taking into account the volumetric shrinkage measured by the shift in the $d_{100}$ peak. We have shown previously that the pore volume fraction in mesoporous films can be controlled by varying the CTAC/TEOS mole ratio in the precursor solution [8]. Raman spectroscopy of calcined fibers indicate that the fibers consist of metasilicate, consist for silica with hydroxide terminated surfaces.

The as-spun, dried and calcined fibers all showed birefringence between cross polarizers in an optical microscope. Consistent with pore orientation along the fiber axis, maximum light transmission occurred with the fiber 45° to the polarizers and nearly complete extinction occurs when parallel and perpendicular to the analyzer. Transmission electron microscopy of microtome sections showed pore alignment over a length scale of at least 10 μm. However, because of difficulties in the microtome technique, the absolute pore orientation with respect to the fiber axis could not be established.

EXAMPLE 7

Spray-Dried Mesoporous Powders

An experiment was conducted to demonstrate making well-ordered mesoporous powders of high surface areas by the method of the present invention.

The spray-drying solution was formed by combining deionized water, HCl, CTAC, followed by TEOS to obtain final mole ratios of: 10.0 $H_2O$, 0.050 HCl, 0.12 to 0.28 CTAC, 1.0 TEOS. The solution was mixed to promote the hydrolysis where the surfactant acts as a emulsifying agent to combine the aqueous and alkoxide phase. In the solution formulation, water rather than alcohol dilution is used to avoid possible explosion hazards. Solutions were spray-dried in a Buchi 190 Mini Spray Dryer operating with an outlet temperature of 120° C. Powders were collected under a cyclone and calcined under the same conditions as the fibers.

Samples were analyzed by powder X-ray diffraction and by nitrogen sorption as described in Example 7 above.

In spray drying the particle morphology was dependent on the precursor solution composition and drying conditions. The surfactant to silica mole ratio was varied between 0.12 and 0.28. SEM analysis showed particle morphology was similar to that of the hollow spheres (see Example 3), except the walls had collapsed during drying. Depending on the spray drying conditions, a range of particle morphologies were possible from solid spherical particles to collapse particles to hollow particles.

Figure 13:
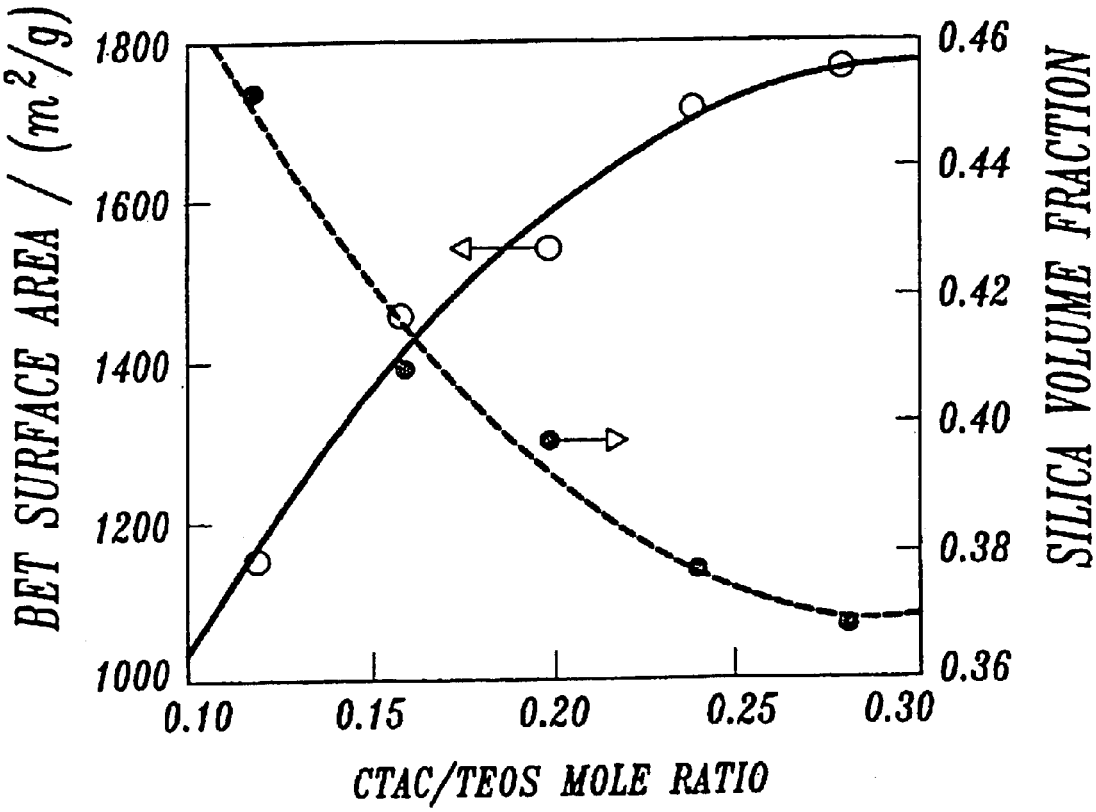
FIG. 13 shows pore volume fraction and the surface area of calcined spray-dried powders as a function of the surfactant to silica mole ratio.
Figure 14:
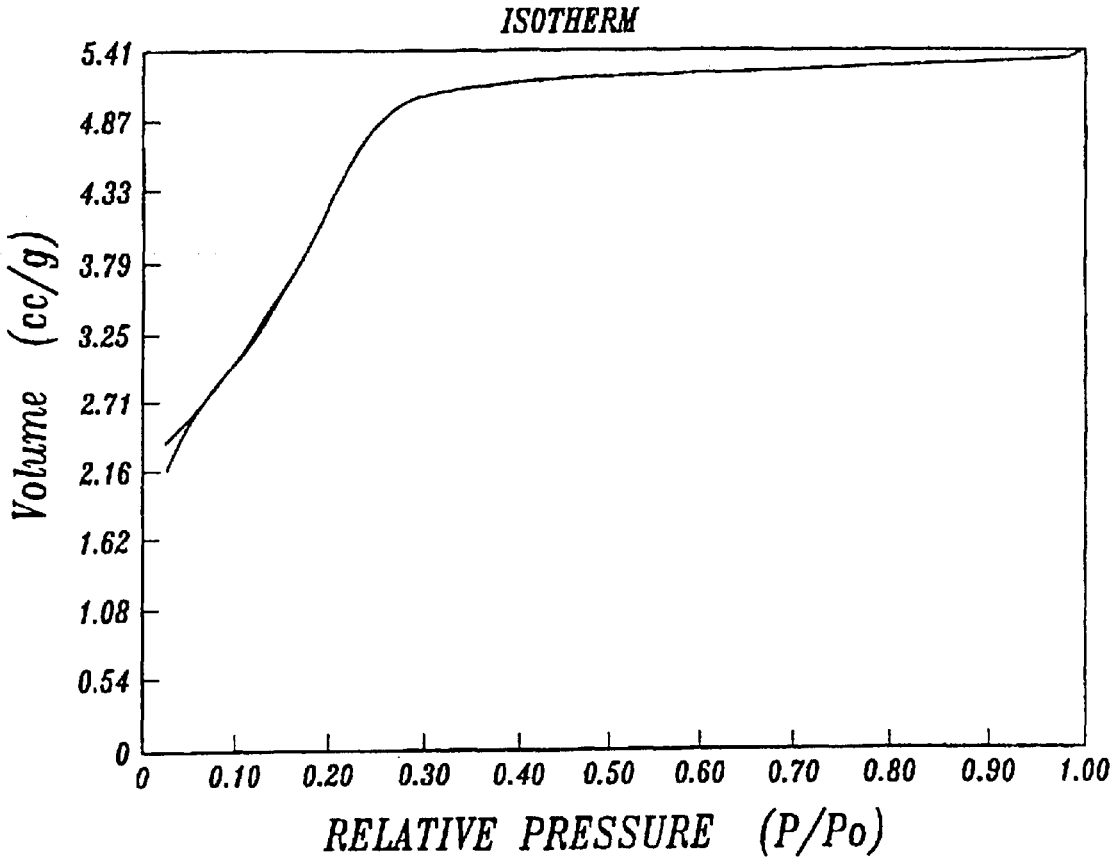
FIG. 14 shows nitrogen adsorption/desorption curves for the mesoporous powder with CTAC/TEOS ratio of 0.28.
Figure 15:
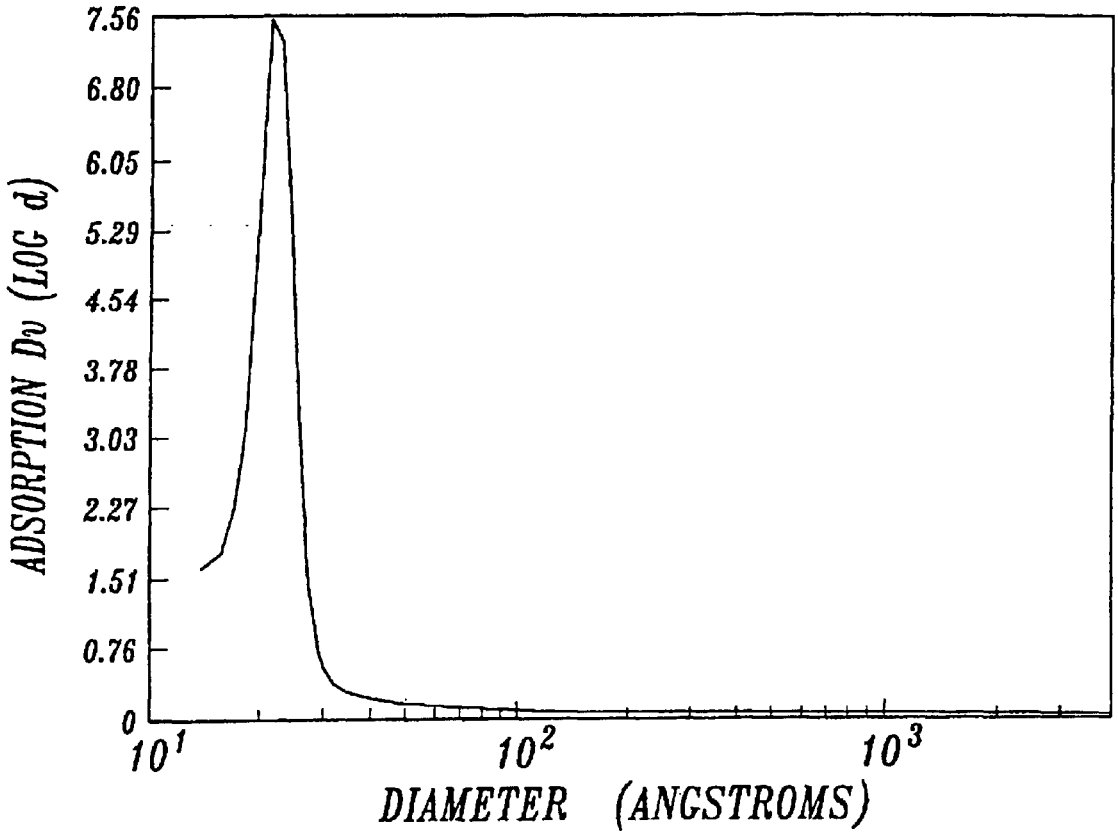
FIG. 15 shows pore-size distribution of the mesoporous powder with CTAC/TEOS ratio of 0.28.
Figure 16:
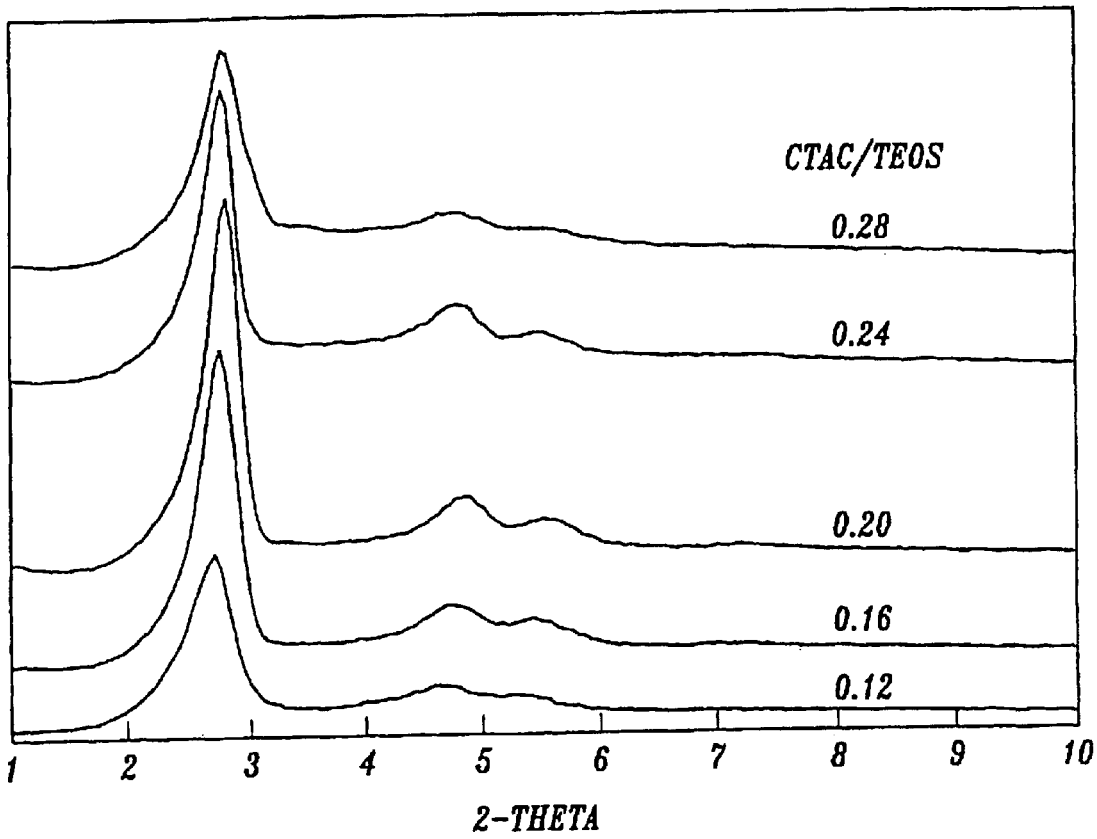
FIG. 16 shows PXRD patterns of calcined spray-dried powders for different surfactant to silica mole ratios.

Pore volume fraction and the surface area as a function of surfactant concentration are shown in FIG. 13. The pore-size distribution plots for the highest surfactant ratio sample are shown in FIGS. 14,15, respectively. A multi-point BET, adsorption/desorption analysis was consistent with the pore size analysis. A maximum pore volume fraction of 63% (37 vol % silica) and a surface area up to 1770 $m^2/g$ was achieved at the highest surfactant concentration. Nitrogen adsorption/desorption curves had no hysteresis and indicate a constant pore size of 25 Å for all surfactant concentrations. In the PXRD patterns for the as-synthesized powders in this series, the (100), (110), (200) and (210) reflections corresponding to a hexagonal array were evident. After calcination the (210) reflections were absent (see FIG. 16). Interestingly, the $d_{100}$ values were relatively constant with surfactant concentration (~38 Å as synthesized and ~32 Å after calcination).

EXAMPLE 8

Spray-Dried Mesoporous Powders

Aluminum was incorporated into the spray dried powders by the addition of aluminum chloride to the precursor solutions.

Aluminum chloride (hexa-hydrated form, Fischer) was combined with d.i. water, hydrochloric acid, CTAC followed by CTAC in the following mole ratios 11.3 H2O/TEOS; 0.10 HCl/TEOS; 0.106 CTAC/($AlCl_3$+TEOS); the $AlCl_3$/TEOS ratios were 0.00, 0.031, 0.063, 0.125 and 0.25. Solutions were spray-dried in a Buchi 190 Mini Spray Dryer operating with an outlet temperature of 120° C. Powders were dried overnight at 105° C. and calcined in air at 350° C. for one hour and 600° C. for 1.5 h.

Figure 17A:
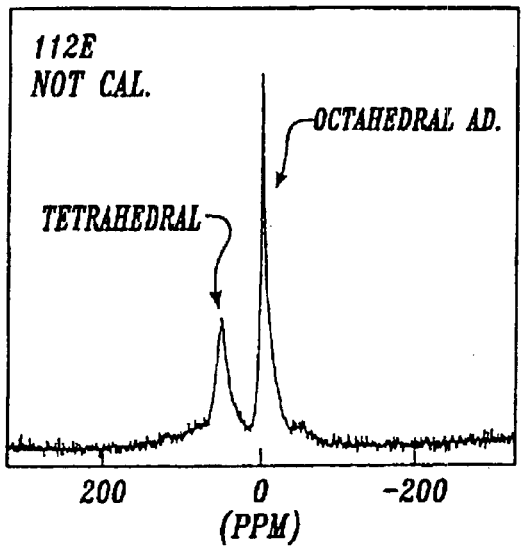
FIG. 17a shows Al-NMR data of mesoporous aluminosilicates, Al:Si mole ratio of 0.25 prior to calcination.
Figure 17B:
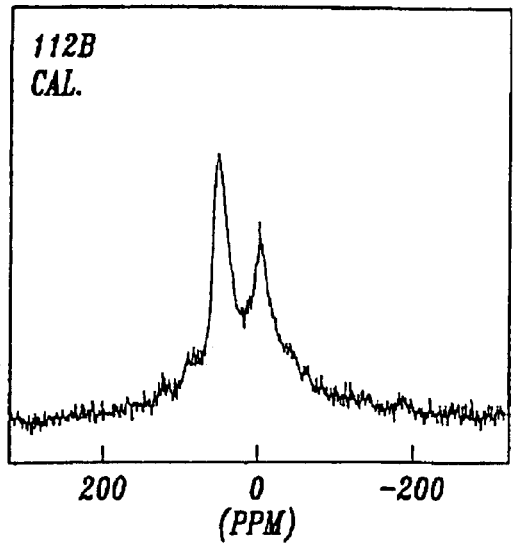
FIG. 17b shows Al-NMR data of mesoporous aluminosilicates, Al:Si mole ratio of 0.031 after calcination.
Figure 17C:
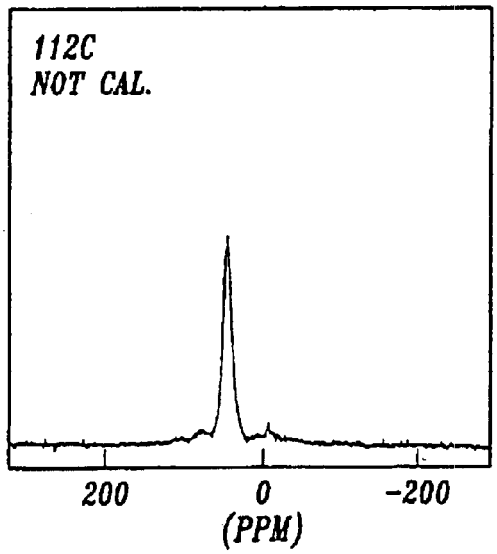
FIG. 17c shows Al-NMR data of mesoporous aluminosilicates, Al:Si mole ratio of 0.063 prior to calcination.
Figure 17D:
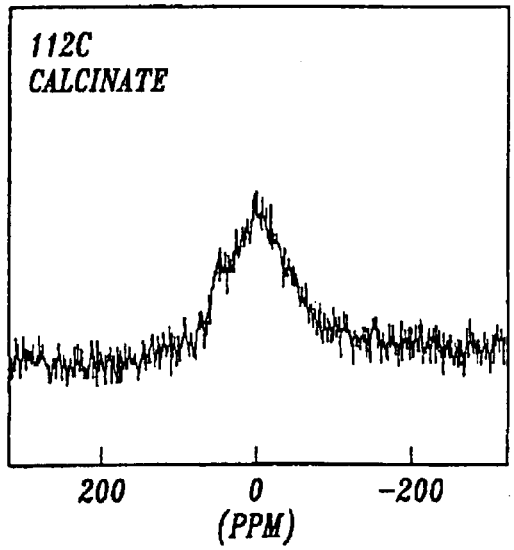
FIG. 17d shows Al-NMR data of mesoporous aluminosilicates, Al:Si mole ratio of 0.063 after calcination.

For an aluminum to silica mole ratio of 0.25 (FIG. 17a), the aluminum in the synthesized powders was a mixture of tetrahedral (framework) and octahedral. Octahedral aluminum would not impart a negative charge to the aluminosilicate. For an aluminum to silica mole ratio of 0.063, the aluminum in the as-synthesized powders was predominately framework, as determined by $^{27}$Al-NMR (see FIG. 17c). However, the framework substitution was not stable with calcination (see FIG. 17d). For an aluminum to silica mole ratio of 0.031, the aluminum in the calcined powders was roughly two-thirds tetrahedral (framework) and one-third in an octahedral coordination (see FIG. 17b).

Figure 18:
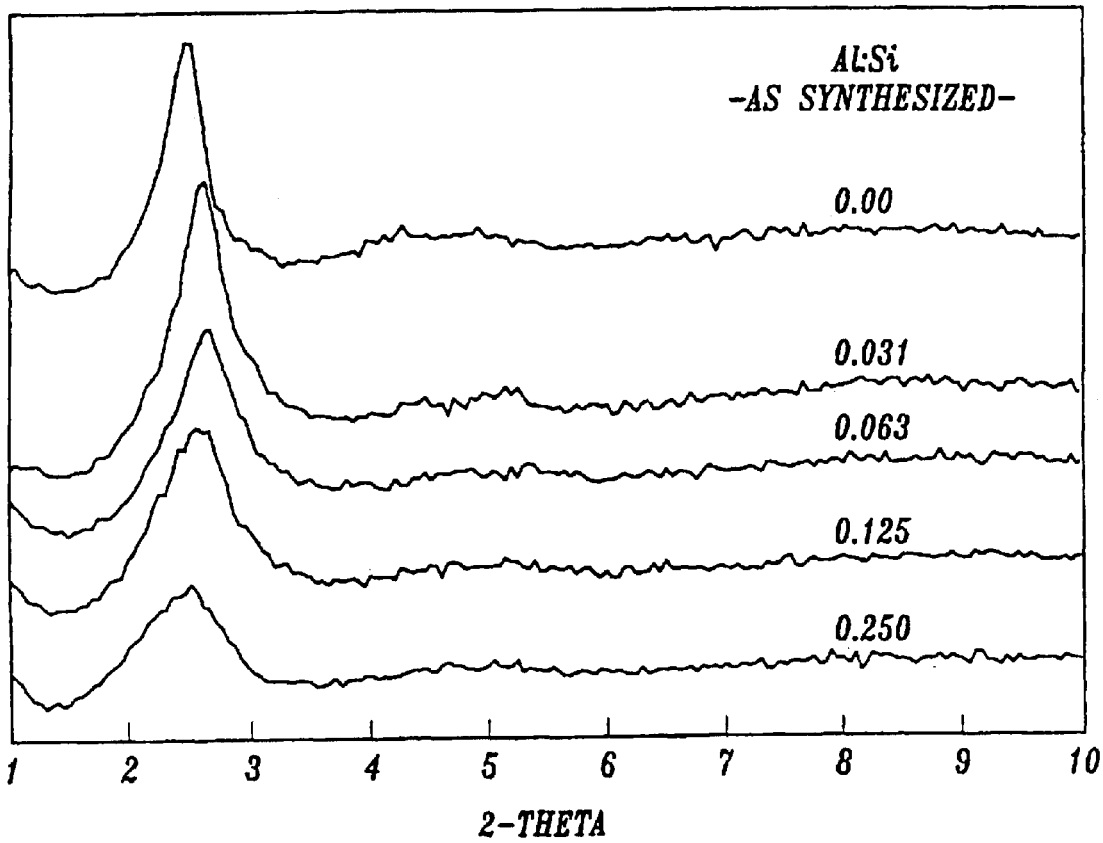
FIG. 18 shows PXRD patterns of as-synthesized spray-dried powders for different aluminum to silica mole ratios.
Figure 19:
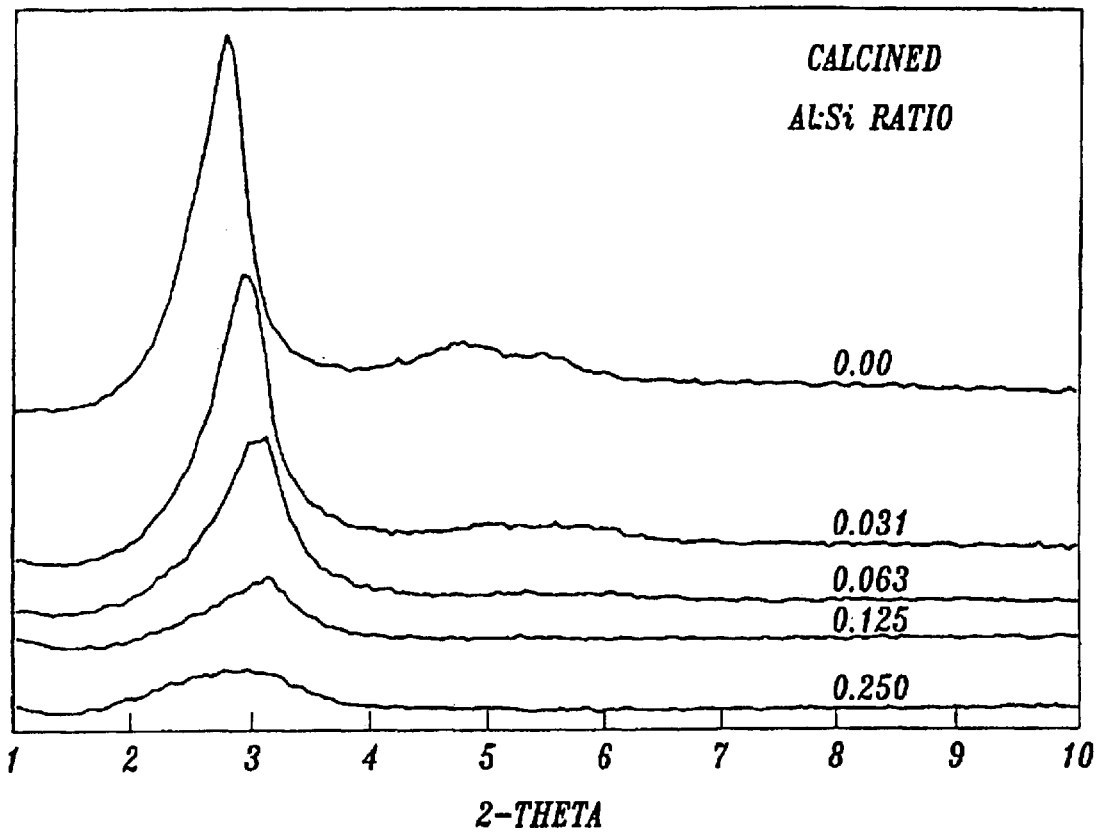
FIG. 19 shows PXRD patterns of calcined spray-dried powders for different aluminum to silica mole ratios.

The x-ray diffraction patterns for the mesoporous powders with aluminum addition are shown in FIGS. 18 and 19 for the as-synthesized and calcined powders. The d-spacing of the primary diffraction peak for each powder, before and after calcination, is summarized in Table 8-1. The table shows an initial decrease in the d-spacing with addition of aluminum chloride salt. The calcined powders with Al:Si mole ratios of 0.125 and 0.25 had a slight brown color (or tan) indicating incomplete calcination of organics due to limited pore accessibility. The remaining calcined powders were white.

TABLE 8-1

| Sample No. | Al:Si molar ratio | $d_{100}$ before calc. | $d_{100}$ after calc. |
|---|---|---|---|
| 56314-112A | 0.00 | 36.Å | 32.Å |
| 56314-112B | 0.031 | 34.Å | 30.Å |
| 56314-112C | 0.063 | 34.Å | 29.Å |
| 56314-112D | 0.125 | 34.Å | 29.Å |
| 56314-112E | 0.250 | 35.Å | 31.Å |

EXAMPLE 9

Loading of a Catalytically Active Metal into Mesoporous Fibers

An experiment was conducted to demonstrate loading of a catalytically active metal into the mesoporous fibers which were produced by the method of the present invention.

A mesoporous fiber supported rhodium catalyst was prepared by incipient wetness impregnation of the mesoporous silica fibers with a rhodium (III) nitrate solution. Rhodium is a good catalyst for reactions including methanol decomposition, alkane partial oxidation and fuel combustion. The loading for rhodium metal was 5% by weight. A solution of rhodium (III) nitrate (10 wt % assay, in nitric acid, Engelhard) was diluted with d.i. water in a volumetric cylinder until the 1.5 ml index was reached. A mass of 2.07 g or the mesoporous silica fibers was used in the catalyst loading. The mesoporous silica fibers were tumbled and the rhodium (III) nitrate solution was added drop wise. Once the rhodium (III) nitrate was impregnated on the mesoporous silica fibers, the fibers were dried at 100° C. in a vacuum overnight, followed by calcination at 350° C. for at least one hour. Prior to catalyst testing mesoporous silica fiber supported rhodium catalyst were activated (reduced to metallic rhodium) with a mixed gas of 10% hydrogen and 90% helium (by volume) at 120° C. for at least one hour.

Fibers with 5 wt % rhodium were used as a supported catalyst to convert methane and air to hydrogen and carbon monoxide. The amount of methane was 29.5 vol % and the amount of air was 70.5 vol %. A small amount of rhodium/fiber supported catalyst (0.041 $cm^3$) was used. Residence time was 8 milli-seconds and the reaction was carried out separately at two temperatures 360 and 445° C. On day 1, the supported catalyst showed activity for both temperatures. The supported catalyst was permitted to cool overnight. However, on day 2, the supported catalyst showed no activity. Because the amount of catalyst was too small to perform an analysis of the failure, a second series of tests were done with an increased quantity of fiber supported catalyst (0.442 $cm^3$).

The residence time for the second series was 50 milliseconds. The supported catalyst was run at 400° C. Again, the supported catalyst was permitted to cool overnight. No loss of activity was observed on the second day.

Because the failure was not duplicated, the reason for it was not determined, nor was the reason for the subsequent success determined.

EXAMPLE 10

An experiment was performed to demonstrate the coating of mesoporous silica onto glass cover slips. The precursor solutions were modified from Example 1 by reducing the amount of acid by half. The calcination temperature was also lowered to 450° C.

Microscope-slide-cover-slipe substrates (22×22 $mm^2$, 0.13 to 0.16 mm thick) were soaked in a solution of sulfuric acid and Nochromix (Godax Labs) and rinsed with deionized water. The precursor solutions were prepared in a 30 ml glass bottle. The bottle was rinsed and dried to remove particulates. Reagents were added by mass using disposable transfer pipettes. Spin-coating precursor solutions were prepared by combining cetyltrimethylammonium chloride (CTAC) (T.C.I. America), deionized water, ethanol (punctilious; Quantum Chemicals), hydrochloric acid (Mallinckrodt) and tetraethyl orthosilicate (TEOS) (Aldrich). The surfactant, water, ethanol and acid were mixed together to allow the surfactant to completely dissolve before TEOS was added. Mass amounts of each reagent in the preparation are shown in Tables E-10a and E-10b for two separate formulations. In the second formulation (# 56483-5), the amount of ethanol was reduced approximately by half.

TABLE E-10a

| Formulation #56483-2 | | |
|---|---|---|
| Reagent | Mass/g | Molar Ratio |
| CTAC | 0.825 | 0.11 |
| water | 2.903 | 7.02 |
| ethanol | 5.501 | 5.07 |
| hydrochloric acid (38 wt %) | 0.122 | 0.05 |
| TEOS | 4.901 | 1.00 |

TABLE E-10b

| Formulation #56483-5 | | |
|---|---|---|
| Reagent | Mass/g | Molar Ratio |
| CTAC | 0.831 | 0.11 |
| water | 2.934 | 6.95 |
| ethanol | 2.715 | 2.44 |
| hydrochloric acid (38 wt %) | 0.148 | 0.06 |
| TEOS | 5.033 | 1.00 |

After TEOS hydrolysis (indicated by the exothermic reaction), the solutions were aged for 1 h prior to coating. The silica species within the precursor solutions would be expected to change with aging. Though these have not be characterized, it was found that the XRD peak intensities improved after 1 h aging.

The substrates were flooded with spin-coating solutions and spun 3000 rpm with a Specialty Coating System Model P-6204A, using the maximum acceleration setting (spin-up time <1 s). To increase silica condensation, coated substrates were post-treated by exposing films to the vapors from drops of concentrated ammonia under an inverted beaker for about 15 min, followed heating at 105° C. overnight in air and calcination at 450° C. To prevent cracking of glass substrates, samples were placed in the box furnace prior to bringing up to temperature.

Figure 20:
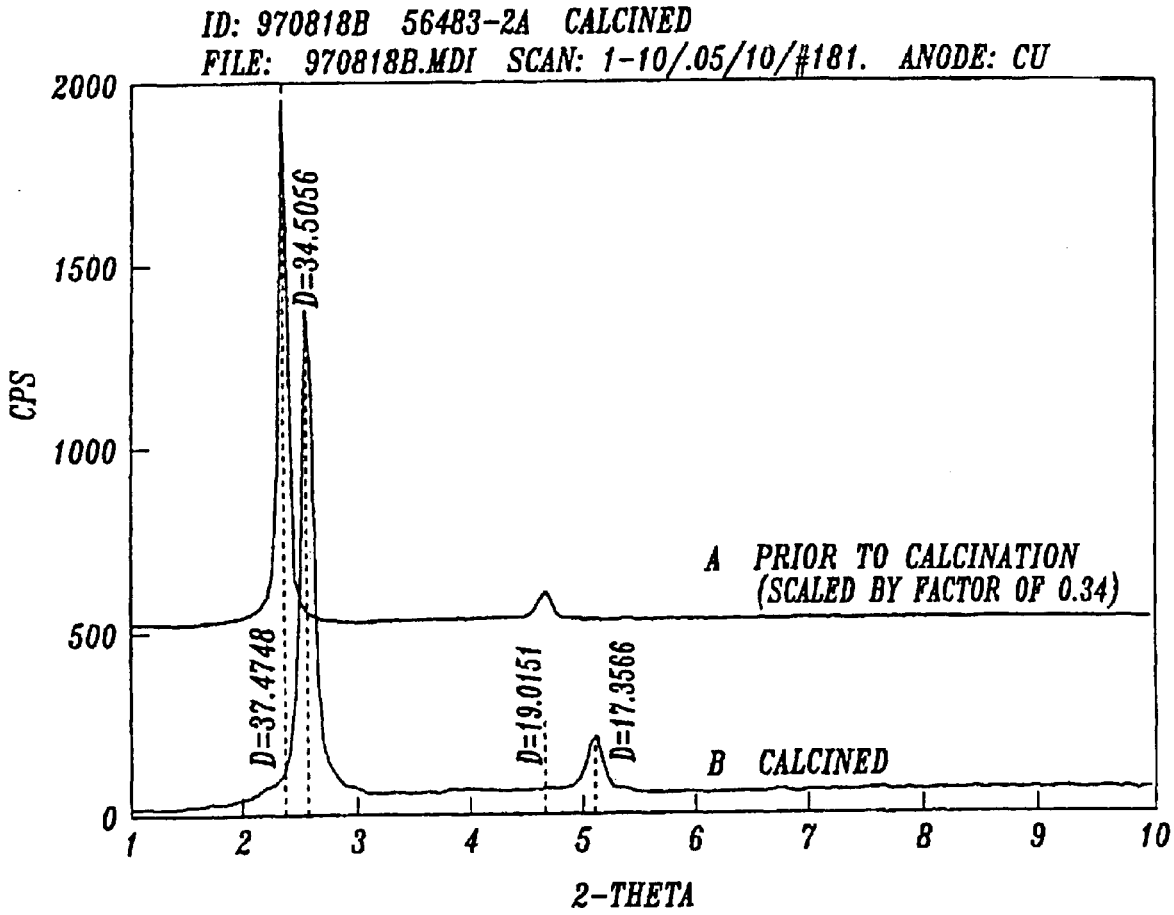
FIG. 20 shows XRD patterns for precalcined (A) and post calcined (B) mesoporous silica film spun using precursor solution #56483-2.
Figure 21:
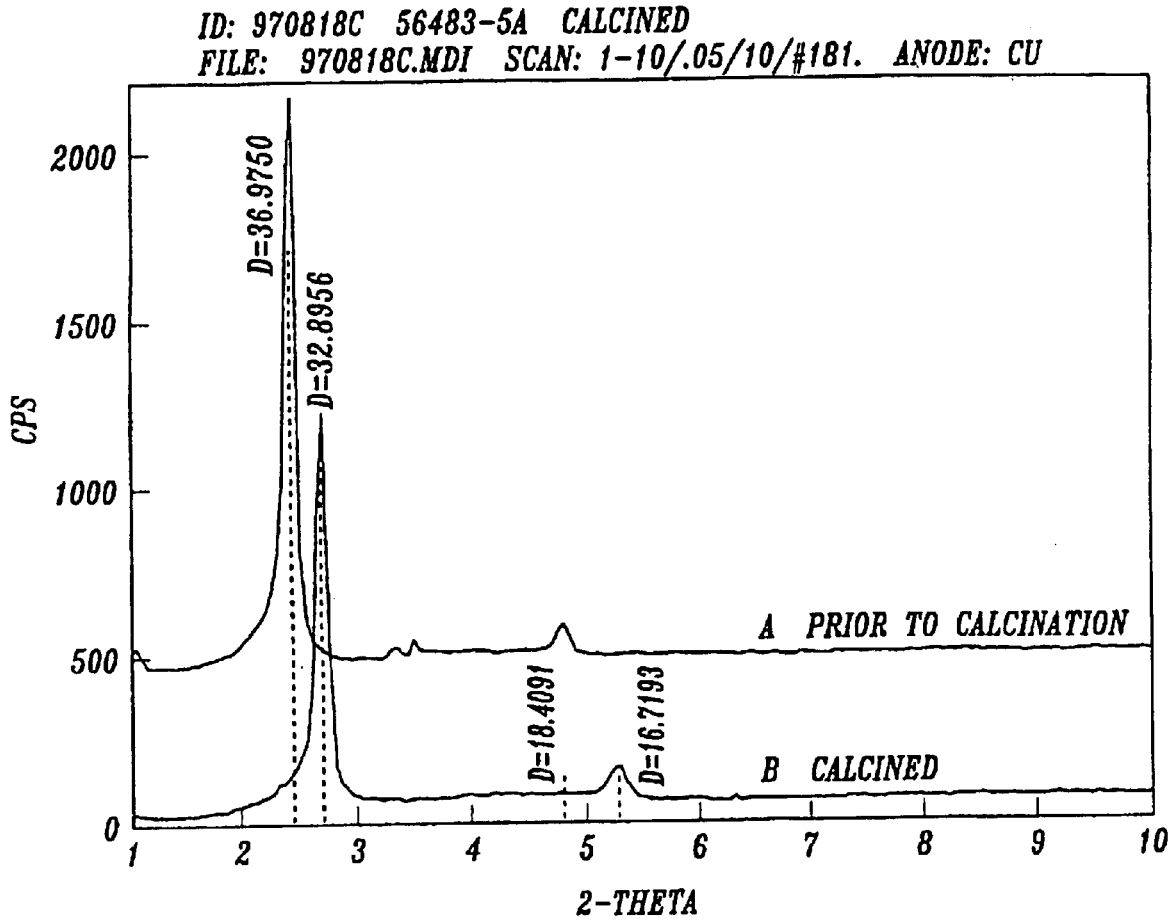
FIG. 21 shows XRD patterns for precalcined (A) and post calcined (B) mesoporous silica film spun using precursor solution #56483-5.

In the XRD patterns (see FIGS. 20 and 21), the (100) and (200) reflections are apparent. The absence of the (110) reflection (or other higher order peaks) suggests the (100) family of planes of the hexagonal array are parallel to the substrate surface. The width of the (100) reflection does not change significantly with calcination, indicating the good stability of the mesoporous structure. Because of the difficulty in located the sample in the same position in the X-ray diffractometer before and after calcination, no interpretation can be made on the change in the peak height (i.e., the decrease of the peak height in FIG. 20 does not necessarily indicate a loss of structural order. The $d_{100}$-spacings are 37.5 Å before and 34.5 Å after calcination for the film prepared with formulation #56483-2; and 36.5 and 33 Å, respectively, for calcination for the film prepared with formulation #56483-5.

The top surface of the spin-coater chuck, on which the covers slips sits during spin coating, consists of a series of radial groves approximately 1 mm apart. This pattern of groves also appears in the interference colors of the films spun from both precursor solutions. It is believed that the chuck acts as a heat sink for the thin cover slip. As the solvent evaporates during spin coating, spatial variations in heat transfer through the cover slip results in temperature variations which in turn results in variations in the film thickness.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

[1. A method of making mesoporous silica materials, comprising the steps of (a) combining a silica precursor with an aqueous solvent, an acid and a surfactant having an ammonium cation into a silica precursor solution, (b) templating the silica precursor with the surfactant and obtaining the mesoporous material from the templated silica precursor, (c) forming said silica precursor solution into a preform; and (d) rapidly evaporating said aqueous solvent from said preform for obtaining the mesoporous material, wherein the improvement comprises:

(i) providing said aqueous solvent in an amount resulting in complete hydrolysis and providing said acid in an amount maintaining a hydrolyzed precursor and avoiding gelation or precipitation; and (ii) providing said surfactant and said silica precursor in a mole ratio that is above a lower mole ratio that produces a non-porous silica phase and below an upper mole ratio that produces a lamellar phase.]

[2. The method as recited in claim 1, wherein said lower mole ratio is about 0.05.]

[3. The method as recited in claim 1, wherein said upper mole ratio is about 0.3.]

[4. The method as recited in claim 1, wherein said acid is added in an amount resulting in a pH of said silica precursor solution of from about 1 to about 4.]

[5. The method as recited in claim 4, wherein said pH is about 2.]

[6. The method as recited in claim 1, wherein the step of forming includes diluting with an alcohol.]

[7. The method as recited in claim 6, wherein said alcohol is ethanol.]

[8. The method as recited in claim 1, wherein said aqueous solvent, said acid, and said surfactant are premixed before combining with said silica precursor.]

[9. The method as recited in claim 1, wherein said mesoporous material is in a geometric form selected from the group consisting of fiber, powder, and film.]

[10. The method as recited in claim 1, wherein said forming is spin-casting.]

[11. The method as recited in claim 1, wherein said forming is spraying.]

[12. The method as recited in claim 1, further comprising adding a pre-polymer or a polymer to said silica precursor solution making a pituitous mixture.]

[13. The method as recited in claim 1, wherein said forming is drawing.]

[14. The method as recited in claim 1, wherein said forming is squeegeeing.]

[15. The method as recited in claim 1, further comprising the step of adding a metal compound to the silica precursor solution.]

[16. The method as recited in claim 15, wherein said metal compound is selected from the group consisting of metal halide, metal nitrate, and combinations thereof.]

[17. The method as recited in claim 16, wherein said metal halide is a metal chloride.]

[18. The method as recited in claim 16, wherein said metal is selected from the group of aluminum, iron and combinations thereof.]

[19. The method as recited in claim 1, wherein said silica precursor is an alkoxide silica precursor or a tetrachlorosilane.]

[20. The method as recited in claim 1, wherein said aqueous solvent amount is characterized by a ratio of said aqueous solvent to said silica precursor of about 7.]

[21. The method as recited in claim 1, wherein said acid amount is characterized by a ratio of said acid to said silica precursor of about 0.1.]

[22. The method as recited in claim 1, further comprising adding a swelling agent to the silica precursor solution.]

[23. The method as recited in claim 22, wherein said swelling agent is 1,3,5-thimethylbenzene.]

[24. The method as recited in claim 1, further comprising the step of calcining the mesoporous material.]

[25. A method of making a mesoporous silica film, comprising the steps of (a) combining a silica precursor with an aqueous solvent, an acid and a surfactant having an ammonium cation into a silica precursor solution, (b) templating the silica precursor with the surfactant and obtaining the mesoporous material from the templated silica precursor, (c) forming said silica precursor solution into a preform; and (d) rapidly evaporating said aqueous solvent from said preform for obtaining the mesoporous material, wherein the improvement comprises:

(i) said silica precursor is tetraethoxysilane;

(ii) providing said aqueous solvent in a superstoichiometric amount and providing said acid in an amount maintaining a hydrolyzed precursor and avoiding gelation or precipitation;

(iii) providing said surfactant and said silica precursor in a mole ratio that is above a lower mole ratio that produces a non-porous silica phase and below an upper mole ratio that produces a lamellar phase; and (iv) said forming includes diluting with an alcohol.]

[26. The method as recited in claim 26, further comprising adding a pre-polymer or a polymer to said silica precursor solution making a pituitous mixture.]

[27. The method as recited in claim 26, wherein said rapidly evaporating is by spin-casting.]

*28. A method of making mesoporous silica materials, comprising the steps of*

*(a) combining a silica precursor with an aqueous solvent, an acid and a surfactant having an ammonium cation into a silica precursor solution,*

*(b) templating the silica precursor with the surfactant and obtaining the mesoporous material from the templated silica precursor,*

*(c) forming said silica precursor solution into a preform; and*

*(d) rapidly evaporating said aqueous solvent from said preform for obtaining the mesoporous material, wherein the improvement comprises:*

*(i) providing said aqueous solvent in an amount resulting in complete hydrolysis and providing said acid in an amount maintaining a hydrolyzed precursor and avoiding gelation or precipitation; and*

*(ii) providing said surfactant and said silica precursor are in a mole ratio that is above a lower mole ratio that produces a non-porous silica phase and below an upper mole ratio that produces a lamellar phase.*

*29. The method as recited in claim 28, wherein said lower mole ratio is about 0.05.*

*30. The method as recited in claim 28, wherein said upper mole ratio is about 0.3.*

*31. The method as recited in claim 28, wherein said acid is added in an amount resulting in a pH of said silica precursor solution of from about 1 to about 4.*

*32. The method as recited in claim 31 wherein said pH is about 2.*

*33. The method as recited in claim 28, wherein the step of forming includes diluting with an alcohol.*

*34. The method as recited in claim 33, wherein said alcohol is ethanol.*

*35. The method as recited in claim 28, wherein said aqueous solvent, said acid, and said surfactant are premixed before combining with said silica precursor.*

*36. The method as recited in claim 28, wherein said mesoporous material is in a geometric form selected from the group consisting of fiber, powder, and film.*

*37. The method as recited in claim 28, wherein said forming is spin-casting.*

*38. The method as recited in claim 28, wherein said forming is spraying.*

*39. The method as recited in claim 28, further comprising adding a pre-polymer or a polymer to said silica precursor solution making a pituitous mixture.*

*40. The method as recited in claim 28, wherein said forming is drawing.*

*41. The method as recited in claim 28, wherein said forming is squeegeeing.*

*42. The method as recited in claim 28, further comprising the step of adding a metal compound to the silica precursor solution.*

*43. The method as recited in claim 42, wherein said metal compound is selected from the group consisting of metal halide, metal nitrate, and combinations thereof.*

*44. The method as recited in claim 43, wherein said metal halide is a metal chloride.*

*45. The method as recited in claim 43, wherein said metal is selected from the group of aluminum, iron and combinations thereof.*

*46. The method as recited in claim 28, wherein said silica precursor is an alkoxide silica precursor or a tetrachlorosilane.*

*47. The method as recited in claim 28, wherein said aqueous solvent amount is characterized by a ratio of said aqueous solvent to said silica precursor of about 7.*

*48. The method as recited in claim 28, wherein said acid amount is characterized by a ratio of said acid to said silica precursor of about 0.1.*

*49. The method as recited in claim 28, further comprising adding a swelling agent to the silica precursor solution.*

*50. The method as recited in claim 49, wherein said swelling agent is 1,3,5-thimethylbenzene.*

*51. The method as recited in claim 28, further comprising the step of calcining the mesoporous material.*

*52. A method of making a mesoporous silica film, comprising the steps of*

*(a) combining a silica precursor with an aqueous solvent, an acid and a surfactant having an ammonium cation into a silica precursor solution,*

*(b) templating the silica precursor with the surfactant and obtaining the mesoporous material from the templated silica precursor,*

*(c) forming said silica precursor solution into a preform; and*

*(d) rapidly evaporating said aqueous solvent from said preform for obtaining the mesoporous material, wherein the improvement comprises:*

*(i) said silica precursor is tetraethoxysilane;*

*(ii) providing said aqueous solvent in a superstoichiometric amount and providing said acid in an amount maintaining a hydrolyzed precursor and avoiding gelation or precipitation;*

*(iii) providing said surfactant and said silica precursor in a mole ratio that is above a lower mole ratio that produces a non-porous silica phase and below and upper mole ratio that produces a lamellar phase; and*

*(iv) said forming includes diluting with an alcohol.*

*53. The method as recited in claim 52, further comprising adding a pre-polymer or a polymer to said silica precursor solution making a pituitous mixture.*

*54. The method as recited in claim 52, wherein said rapidly evaporating is by spin-casting.*

*55. A method of making a mesoporous film on a substrate, the method comprising the steps of:*

*(a) combining a silica precursor with an aqueous solvent, an acid catalyst and an ammonium cationic surfactant into a precursor solution;*

*(b) dispensing said precursor solution onto the substrate;*

*(c) forming a film by evaporation of the solvent in less than 5 minutes; and*

*(d) heating the film on the substrate to a temperature sufficient to decompose the surfactant, thereby producing a mesoporous film on the substrate.*

*56. The method of claim 55 wherein the precursor solution is a silica precursor solution and wherein the surfactant and the silica precursor solution are in a mole ratio that is above a lower mole ratio that produces a non-mesoporous silica phase and below an upper mole ratio that produces a lamellar phase.*

*57. The process of claim 55, wherein the film exhibits an index of refraction between 1.16 and that of silica.*

*58. A process to form mesostructured films, comprising:*

*(a) preparing a precursor sol containing a soluble source of silica, an aqueous solvent, an ammonium cationic surfactant and an acid catalyst; and*

*(b) depositing the precursor sol on a substrate wherein evaporation of solvent and water is less than 5 minutes causes the formation of said mesostructured films on the substrate surface.*

*59. The process of claim 58 wherein the aqueous solvent and the catalyst are provided in amounts that maintain a hydrolyzed precursor sol while avoiding gelation or precipitation.*

*60. The process of claim 58 wherein the soluble source of silica is a silica precursor alkoxide or tetrachlorosilane and wherein the surfactant and the soluble source of silica are in a mole ratio that is above a lower mole ratio that produces a non-porous silica phase and below an upper mole ratio that produces a lamellar phase.*

*61. The process of claim 58, wherein the ammonium cationic surfactant further includes alkyl triethylammonium chloride or bromide surfactants with different chain lengths.*

*62. The process of claim 58, further comprising the step of calcining said film at 450° C.*

*63. The process of claim 58, wherein the precursor sol is deposited on a substrate by spin coating.*

*64. The process of claim 58, wherein said soluble source of silica is an alkoxide silica precursor or tetrachlorosilane.*

*65. The process of claim 58, wherein the films exhibit an index of refraction between 1.16 and that of silica.*

*66. A process to form a mesoporous structure, comprising:*

*(a) preparing a precursor sol containing a soluble source of silica, an alcohol and water solvent, an ammonium cationic surfactant, and an acid catalyst, wherein said solvent is provided in an amount resulting in complete hydrolysis and said acid catalyst is in an amount to maintain a hydrolyzed precursor and to avoid gelation or precipitation in said precursor sol;*

*(b) forming the precursor sol into a preform;*

*(c) evaporating said solvent from the preform at a rate that forms a mesostructured material; and*

*(d) calcining the mesostructured material to form a mesoporous structure.*

*67. The process of claim 66, wherein said precursor sol contains alcohol which is a byproduct of hydrolysis, and said mesoporous structure is a film.*

*68. The process of claim 66, wherein said preform is a droplet, said alcohol is a byproduct of hydrolysis, and said sol is spray dried to form a powder.*

*69. The process of claim 66, wherein said drying is preformed in less than 5 minutes.*

*70. The process of claim 66, wherein said precursor sol contains dilutant alcohol, and wherein the mesoporous structure is a film.*

*71. The process of claim 66, wherein the mesoporous structure is a film and wherein the film exhibits an index of refraction of between 1.16 and that of silica.*

*72. The process of claim 66, wherein the said precursor sol contains alcohol which is a byproduct of hydrolysis, and wherein said mesostructure is a film.*

*73. The process of claim 72, wherein the film exhibits an index of refraction of between 1.16 and that of silica.*

*74. The process of claim 66, wherein said preform is a droplet, wherein said alcohol is a byproduct of hydrolysis, and wherein said precursor sol is spray dried.*

*75. The process of claim 66, wherein said evaporating is performed in less than 5 minutes.*

*76. The process of claim 66, wherein said soluble source of silica includes a silica alkoxide precursor or tetrachlorosilane.*

*77. A process to form a mesoporous structure, comprising:*

*(a) preparing a precursor sol containing a soluble source of silica, an alcohol and water solvent, an ammonium cationic surfactant, and an acid catalyst, wherein said solvent is provided in an amount resulting in complete hydrolysis and said acid is in amount to maintain a hydrolyzed precursor and to avoid gelation or precipitation in said precursor sol;*

*(b) forming the precursor sol into a preform;*

*(c) evaporating said solvent from the preform at a rate that forms a mesostructured material, wherein said mesostructured material contains surfactant; and*

*(d) calcining the mesostructured material to form a mesoporous structure.*

*78. A process to form a mesostructure, comprising:*

*(a) preparing a precursor sol containing a soluble source of silica, water and alcohol solvent, an ammonium cationic surfactant and an acid catalyst; and*

*(b) evaporating said solvent in less than 5 minutes to cause the formation of a mesostructure, wherein said mesostructure contains surfactant.*

*79. The process of claim 78, wherein the mesostructure is a film, and wherein the film exhibits an index of refraction of between 1.16 and that of silica.*

*80. A process to form a mesostructure, comprising:*

*(a) preparing a precursor sol containing a soluble source of silica, a water and alcohol solvent, an ammonium cationic surfactant and an acid catalyst, and*

*(b) evaporating said solvent in less than 5 minutes to cause the formation of a mesostructure.*

*81. The process of claim 80, wherein said solvent is evaporated in less than 1 minute.*

*82. The process of claim 80, wherein said solvent is evaporated in less than 10 seconds.*

*83. The process of claim 82, wherein the mesostructure is a film, and wherein the film exhibits an index of refraction of between 1.16 and that of silica.*

*84. The process of claim 80, wherein the said precursor sol contains both dilutant alcohol and alcohol which is a byproduct of hydrolysis, and wherein said mesostructure is a film.*

*85. The process of claim 80, wherein said preform is a droplet, said alcohol is a byproduct of hydrolysis, and said sol is spray dried.*

*86. The process of claim 80, wherein the ammonium cationic surfactant further includes alkyl triethylammonium chloride or bromide surfactants with different chain lengths.*

* * * * *

UNITED STATES PATENT AND TRADEMARK OFFICE

CERTIFICATE OF CORRECTION

PATENT NO. : RE 40,299 E
APPLICATION NO. : 09/481988
DATED : May 6, 2008
INVENTOR(S) : Paul J. Bruinsma et al.

It is certified that error appears in the above-identified patent and that said Letters Patent is hereby corrected as shown below:

Column 20, line 47, the word “thimethylbenzene” should read -- trimethylbenzene --;
Column 20, line 58, the words “precursor solution” should read -- precursor --;
Column 22, line 18, the word “thimethylbenzene” should read -- trimethylbenzene --;
Column 22, line 29, the words “precursor solution” should read -- precursor --;
Column 23, line 8, the word “is” should read -- in --.

Signed and Sealed this

Eighth Day of September, 2009

David J. Kappos

David J. Kappos
*Director of the United States Patent and Trademark Office*